United States Patent [19]

Richards et al.

[11] Patent Number: 5,493,503

[45] Date of Patent: Feb. 20, 1996

[54] CLAMP CONTROL FOR INJECTION MOLDING MACHINE

[75] Inventors: Thomas H. Richards, Brunswick Hills; Thomas C. Bulgrin, Columbia Sta.; Alexander M. Galan, Parma, all of Ohio

[73] Assignee: Van Dorn Demag Corporation, Strongsville, Ohio

[21] Appl. No.: 296,658

[22] Filed: Aug. 26, 1994

Related U.S. Application Data

[63] Continuation-in-part of Ser. No. 247,082, May 20, 1994.

[51] Int. Cl.$^6$ ............................................. B29C 45/76
[52] U.S. Cl. .................... 364/476; 264/40.5; 264/40.7; 425/135
[58] Field of Search .................. 364/148, 473, 364/476, 477; 264/40.1–40.7; 425/135, 143, 144, 149, 150, 157, 159, 160, 170, 171

[56] References Cited

U.S. PATENT DOCUMENTS

| | | | |
|---|---|---|---|
| 4,695,237 | 9/1987 | Inaba | 364/477 |
| 4,740,148 | 4/1988 | Fujita et al. | 364/476 |
| 4,823,274 | 4/1989 | Kiya et al. | 364/476 |
| 4,837,490 | 6/1989 | Neko | 364/476 |
| 4,842,801 | 6/1989 | Kamiguchi et al. | 364/476 |
| 4,847,023 | 7/1989 | Neko | 364/476 |
| 4,847,779 | 7/1989 | Masao et al. | 364/476 |
| 4,899,288 | 2/1990 | Tsutsumi | 364/476 |
| 5,012,426 | 4/1991 | Harada et al. | 364/476 |
| 5,210,698 | 5/1993 | Topmiller | 364/476 |
| 5,225,122 | 7/1993 | Inaba et al. | 425/135 |
| 5,229,952 | 7/1993 | Galloway et al. | 425/135 |
| 5,246,643 | 9/1993 | Inaba et al. | 425/136 |
| 5,291,391 | 3/1994 | Mead et al. | |
| 5,316,707 | 5/1994 | Stancia et al. | 425/135 |

OTHER PUBLICATIONS

"Digital Filters", Third Edition, by R. W. Hamming, published by Prentice Hall, 1989, specifically pp. 1–20.

"Digital Control System Analysis and Design", Second Edition, by Charles L. Phillips and H. Troy Nagle, published by Prentice Hall, 1990, specifically pp. 459–480.

"Computer Controlled Systems", Second Edition, by K. J. Astrom and Bjorn Wittenmark, published by Prentice Hall, 1990, specifically pp. 150–151, 199–201, 233–235.

"Numerical Recipes in C", by W. H. Press, B. P. Flannery, S. A. Teukolsky, W. T. Vetterling, published by Cambridge University Press, 1988, specifically pp. 452–460.

Article entitled "The Application of Advanced Control Theory to Enhance Molding Machine performance", appearing at pp. 94–102 of IEEE *Conference Record of 1994 Forty–sixth Annual Conference of Electrical Engineering Problems in the Rubber and Plastics Industries*, Apr. 26 & 27, 1994 (not prior art).

*Primary Examiner*—Roy N. Envall, Jr.
*Assistant Examiner*—Thomas E. Brown
*Attorney, Agent, or Firm*—Frank J. Nawalanic

[57] ABSTRACT

A control system utilizing a programmable controller for an injection molding machine in which the controller is periodically scanned in response to input signals to produce output control signals is provided with an impulse response filter arrangement. The impulse response filter senses a plurality of current and past sensor input signals to accurately predict the occurrence of a variable triggering event which will in fact be sensed by a sensor. A predictive sensor signal is then generated which is inputted to the controller in advance of the occurrence of the triggering event and at a time which corresponds to the processor scan time so that the controller generates the desired output at the precise time the triggering event occurs thus eliminating controller response latency from the control system.

32 Claims, 10 Drawing Sheets

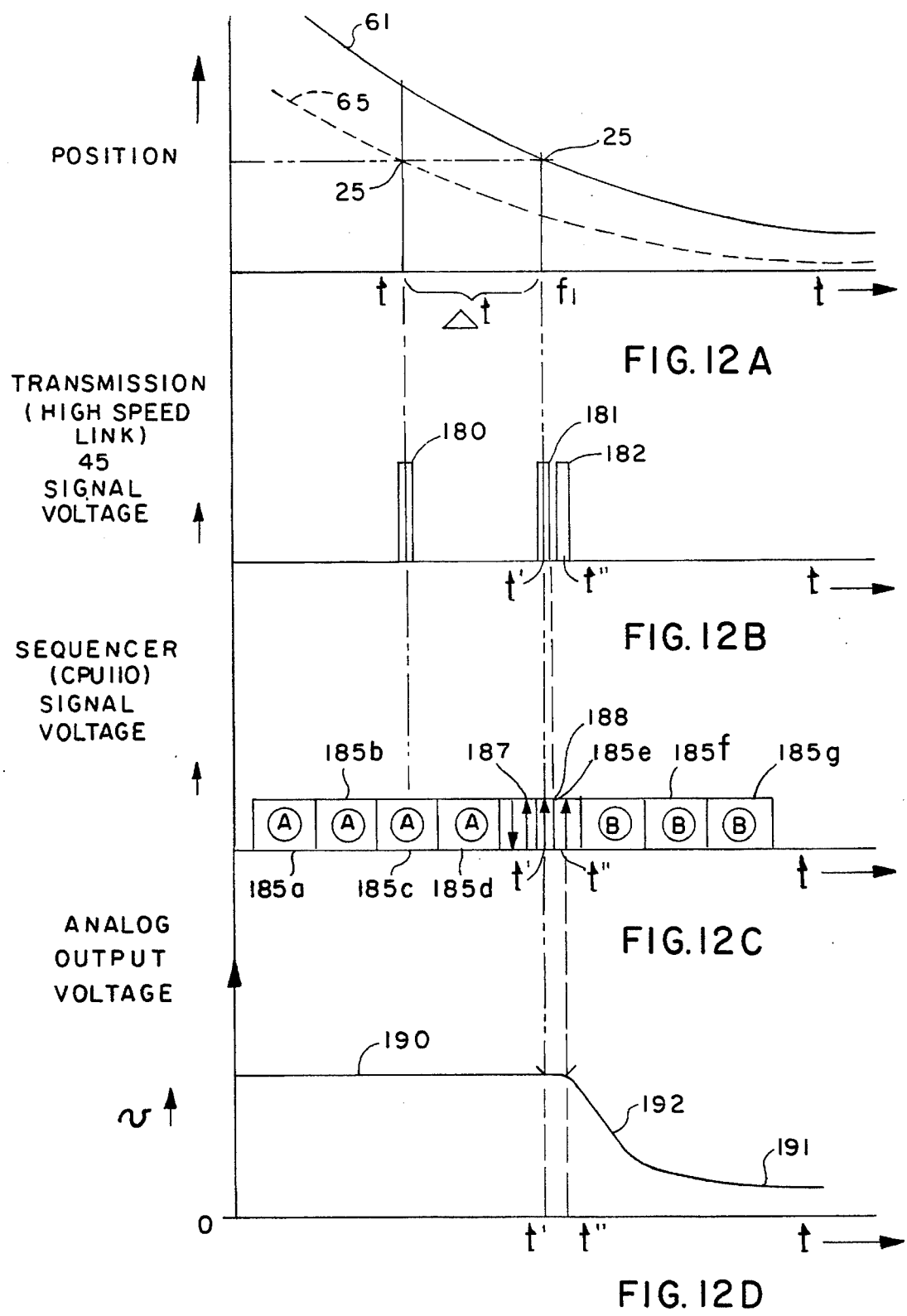

TIMING CHART FOR FEED FORWARD
CANCELLATION OF CLAMP MOMENTUM

CLAMP CONTROL FOR INJECTION MOLDING MACHINE

This application is a continuation-in-part of U.S. application Ser. No. 247,082, filed May 20, 1994, entitled "Barrel Temperature State Controller For Injection Molding Machines".

This invention relates generally to control systems and more particularly to an improved control system for injection molding machines using programmable controllers.

The invention is particularly applicable to and will be described with specific reference to an improved control system for clamping and releasing the mold of an injection molding machine. However, those skilled in the art will recognize the invention has numerous other applications in which an output signal, variable or constant, is made in response to an input signal derived from a sensor to regulate an injection molding machine function such as velocity, screw rotation, position, pressure, etc.

INCORPORATION BY REFERENCE

U.S. patent application Ser. No. 247,082, filed May 20, 1994 and an article authored by the inventors hereof entitled "The Application of Advanced Control Theory to Enhance Molding Machine Performance", appearing at pages 94–102 of IEEE *Conference Record of* 1994 *Forty-sixth Annual Conference of Electrical Engineering Problems in the Rubber and Plastics Industries*, Apr. 26 & 27, 1994, is hereby incorporated by reference.

The following material which does not, per se, form any part of the invention, is also incorporated by reference so that details known to those skilled in the art need not be repeated herein:

a) "Digital Filters", Third Edition, by R. W. Hamming, published by Prentice Hall, 1989, specifically pages 1–20;

b) "Digital Control System Analysis and Design", Second Edition, by Charles L. Phillips and H. Troy Nagle, published by Prentice Hall, 1990, specifically pages 459–480;

c) "Computer Controlled Systems", Second Edition, by Karl J. Astrom and Bjorn Wittenmark, published by Prentice Hall, 1990, specifically pages 150–151, 199–201, 233–235;

d) "Numerical Recipes in C", by William H. Press, Brian P. Flannery, Saul A. Teukolsky, William T. Vetterling, published by Cambridge University Press, 1988, specifically pages 452–460; and e) U.S. Pat. No. 5,291,391 to Mead et al., issued Mar. 1, 1994.

BACKGROUND

Mold closing of an injection molding machine is typically accomplished either hydraulically or mechanically via a toggle mechanism. The invention specifically applies to both closing arrangements. However, for ease in discussion, the invention will initially be described for hydraulic clamping arrangements.

A) Control Systems Used in Injection Molding Machines to Regulate Mold Closing Mold closing typically occurs in a two-speed or two-step arrangement. After the mold halves open and the molded part is ejected from the mold, one of the mold members is brought rapidly into close proximity to the other mold member where its motion slows. The motion of the now slowly moving mold member is brought to a stop just as the mold members contact one another or "kiss". The plastic is then injected to complete the molding cycle.

It is appreciated that the time for mold closing comprises just one portion of the mold cycle but nevertheless is an important consideration regarding the throughput of the machine. For example, a ten second mold cycle, which is somewhat typical, could be significantly improved if the mold closing step could be improved by as little as one tenth of a second.

The mold closing mechanism uses a position sensor to determine the position of the mold halves which is typically a linear potentiometer for a hydraulic clamp and a rotary potentiometer for a toggle clamp. At the start of mold closing, the machine hydraulics move one of the mold halves at a fast rate of speed to quickly close the mold through the major portion of its travel. When the moving mold member "trips" or crosses a pre-set voltage the speed is reduced to a slower speed and when a second crossover position is reached, the mold motion stops. Now it will be appreciated that from the time the first crossover switch is actuated, some time must elapse before the flow control valve is actuated to reduce the speed. Further, once the flow control valve is actuated, the momentum of the mold carries it forward. If the machine runs only one mold, it is possible through trial and error to set the trip or crossover positions, to give a minimum mold close cycle time. In fact, improvements have been made by using an additional crossover position which is triggered prior to the time the first crossover occurs. This arming switch adjusts for the momentum of the moving mold member and provides a better control than the single crossover switch. However, the control relies on a trial and error approach for one specific part to achieve any degree of optimization. Further the control assumes the hydraulics of the machine remains essentially constant and is repeated cycle after cycle. Should there be any variation in the speed which could occur for any number of reasons between cycles or within a cycle, the momentum of the moving mold member changes affecting control, etc.

A recent development in this area has been to employ an algorithm in a programmable logic control. The algorithm determines the momentum of the moving mold member based on the speed set by the operator so that the moving mold member can be stopped at the point where it contacts the closed member. Because of the time it takes to compute the calculation by the machine's microprocessor, the speed of the moving member is set in advance based on the values set by the machine operator. The microprocessor then has sufficient time to perform the algorithm calculation (since it is performed when the command signal is set) so that an output signal is timely sent to the proportioning flow valve during mold close. So long as the speed of the moving mold member equals that set by the operator, the control is acceptable and represents an improvement over the devices discussed above. Should there be a variation between the actual speed and the set speed, the control is unresponsive. Further the control is implemented for only one stage, start-stop. There is no crossover position.

In theory, a closed loop feedback control should be ideal for this application. In practice, closed loop feedback control loops have not proven acceptable for control of mold closing for at least three reasons. The primary reason is that a closed loop having an acceptable frequency of response has not been developed. That is, a closed loop control capable of being properly tuned has not been developed, and may not be able to be developed. For example, to dissipate the stored energy or momentum of the moving mold member typically requires about 300 milliseconds. As a generally accepted rule of thumb in control theory, it takes about five times the time span of the controlled event to control the event. Thus, while the velocity of the ram can be observed and adjusted in time from increments satisfactorily within the constraints of this rule, to control the momentum of the moving mold member would take, in theory, about one and one-half seconds. This is totally unacceptable and explains why closed loop feedback control has not been used to control clamp closing. The second reason is that feedback or closed loop is traditionally known in the art as not being "time optimal". Specifically, closed loop as a control technique does not optimize or reduce to a minimum the time it takes to control the function. The last reason dictating against the use of closed loop control of mold closing is more subtle. A closed loop control requires profiling. Like the algorithm calculation noted above, the speed of the clamp is controlled throughout its travel. Injection mold machine operators typically view the control as two stage, i.e., fast-slow and slow-stop, open loop arrangements. To the extent that profiling the closing action involves change, there is some reluctance on the part of the end user to accept such controls.

B) Control Art

In accordance with conventional programmable logic control (PLC) theory, all controls have response latency. For example, in the case of a clamp control, it can be considered that there are two processing states, namely, state A in which a mold member starts to close at a fast speed and state B in which the mold member closes at a slow speed until it contacts the other mold member whereat it stops. Upon detection of an event, E, i.e., the crossover position, the output, i.e., the proportioning control valve is set from a fast speed rate 0 to a slow speed rate 0'. In normal PLC systems, an average response latency of at least ½ of $T_A$, the execution of the state A sequence instruction, will be realized in setting output 0 to state 0' and switching sequence execution to state B. Various techniques are known to reduce the response latency, $T_A$. One method is to interrupt the scan of the sequence instructions for state A when event E is detected. Other methods involve pre-arming techniques where the analog output card is pre-programmed to respond to position E without processing a logic scan. Still another method is disclosed in U.S. Pat. No. 5,291,391 in which a specific sensor signal is sent to a "fast" processing portion of the programmable controller to independently early generate a specific output signal. Of course if the sensor information needed for event E is required in the control logic, such as that required in a molding cycle, the information is not available until the scan is complete. In general, these methods involve drastic increases in the complexity of the logic program and severe limitations in what logic processing is available when the set point or crossover position is reached. Also, these methods do not address the remaining sources of latency nor problems in controlling cycle to cycle repeatability or "jitter".

Finally, it should be noted as gathered from the material incorporated by reference herein that feed forward, state controllers, and finite impulse response filters are devices which are known per se. They have not heretofore been used in injection molding control systems because it is believed, of the complexities and peculiarities of the molding cycles performed in injection molding machines and also the processing power limitations of current controls. Further, the use of such techniques have been disclosed and discussed, in theory, with respect to single function controls employed in an external loop. They have not been conventionally used in PLC's or in combination with PLC's and external loops. Significantly, signal noise considerations have limited practical applications of state controllers or finite impulse response filters.

SUMMARY OF THE INVENTION

Accordingly, it is a principal object of the invention to provide a control system in which a sensed event in a molding cycle results in an instantaneous output and change in the molding cycle without lag or overtravel.

This object along with other features of the invention is achieved in a general, broad inventive sense, by a control system which uses any conventional, programmable controller to regulate at least one output device by an output signal produced in response to a sensor sensing measurements of when an actual event programmed into the controller as a command signal occurs. The sensor generates prior sensing signals before the actual event occurs and an actuating sensor signal when the actual event occurs and the controller periodically evaluates a first set of normal equations to produce at least the output signal in response to the actuating sensor signal. The system includes a finite impulse response filter arrangement for establishing a predictive sensor signal indicative of the occurrence of the event prior to the time the actuating sensor signal is generated by periodically evaluating a second set of equations utilizing certain prior sensor signals. A comparator is provided to compare the predictive sensor signal with the command signal or, alternatively, the prior sensor signal with a predictive command signal to establish a state of comparison. A transmitting arrangement, actuated when the comparator indicates a change in the state of comparison, transmits the predictive sensor signal status as the actuating sensor signal status to the programmable controller at a set time prior to the occurrence of the actual event which substantially coincides with the time expended by the programmable controller in evaluating the first set of equations whereby the response latency of the controller is substantially eliminated.

In accordance with another important aspect of the invention, the control system includes a synchronizing arrangement which receives the output signal generated by the controller in response to the predictive sensor signal status and delays the transmission of the output signal to the output device until the synchronizing arrangement receives the actual sensor signal whereby the output signal is prevented from being inadvertently early generated while simultaneous transmission of the output signal with the occurrence of the actuating sensor signal is achieved.

In accordance with yet another general feature of the invention, the finite impulse response filter arrangement periodically samples and averages a plurality of sensor signals indicative of the current state of the sensor and a similar plurality of a past sensor state which produces relatively clear, noise-reduced signals to enable accurate calculations of a future sensor state occurring at the set time period to produce the predictive signal. The predictive sensor signal can then be accurately compared with the command signal to indicate a change in the state of comparison at the precise set time prior to the occurrence of the actual event.

In accordance with a specific feature of the invention, particularly useful for regulating a molding cycle in which the cycle sequentially proceeds in stages from mold closing through injection, recovery, mold opening, and eject the programmable controller performs a first set of normal equations controlling the current state of the molding cycle and when certain conditions are sensed and inputted to the current state, the programmable controller switches from the current state to a successive state which is processed by a second set of normal equations indicative of that state. Significantly, prior to starting the programmable scan in the next successive state with input signals, output signals are read out to select output devices thus avoiding scan interrupt schemes and complicated logic associated therewith.

In accordance with a more specific feature of the invention, the first set of normal equations and the second set of normal equations are identical and the input signal triggering the transition from the current state to another state is a predictive sensor signal status advanced in time so that state transitions can be orderly progressed during the mold cycle without time lag while output devices precisely controlled. Still further, the input signals for the start of the scan of the next successive state are delayed until arrival of the actual signal of the sensed event which is not processed by any logic scan to assure timely transition of output signals not only to the output device but also to start the scan of the next successive state.

In accordance with yet another important feature of the invention a number of finite impulse response filters can be provided in the control system, each calculating a predictive sensor signal indicative of a control variable affecting the responsiveness of the system to the specific event which is to be controlled (or to other different controlled events) with the predictive sensor signal statuses inputted to the programmable controller as if they were actuating sensor signals and the logic of the controller used to produce the output signal at the precise time without time lag attributed to the processing time of the controller or time lag attributed to the responsiveness of the output device or system response to the output device.

In accordance with a specific feature of the invention, a control apparatus is provided for regulating the closing of an injection molding machine which includes a mold having a stationary member and a movable member; a hydraulic arrangement for moving the moving mold member over a fixed distance into contact with the stationary member which includes a pump and a flow control arrangement for variably controlling the pump in response to an electrical output signal whereby the speed of the moving mold member is controlled; an operator console arrangement for variably setting a command signal to establish a first crossover position whereat the speed of the moving mold member is changed in advance of a mold close position the moving mold member occupies when it contacts the stationary mold member, and a sensor associated with the moving mold member for continuously generating input sensor signals indicative of the position of the moving mold member at any given time. The control system includes a programmable controller for periodically evaluating a first set of equations to generate the output signal corresponding to the command signal in response to a selected sensor signal generated by the sensor when the moving mold member reaches the first crossover position. A finite impulse response filter arrangement is provided for receiving the sensor signals and periodically evaluating a second special set of equations determinative of the current speed of the moving mold member based on the sensor signal to develop a predictive sensor signal and a mechanism is provided to transmit the predictive sensor signal status as the selected sensor signal to the programmable controller at a set time prior to the moving mold member reaching the first crossover position whereby the programmable controller causes the moving mold member to change speed when it reaches the first crossover position without overtravel. Specifically the set time is set to be equal to or greater than the response latency of the programmable controller and/or the variation in response latency of the programmable controller and/or the time to dissipate momentum or inertia of the moving mold member.

In accordance with yet another specific but important aspect of the invention, the finite impulse response filter arrangement preferably determines an advanced position of the moving mold member at any given time by calculating the current speed of the moving mold member and adding to the current sensed position of the moving mold member the distance the moving mold member travels at the calculated speed during the set time period to periodically generate a variable predictive signal corresponding to an advanced position of the moving mold member at any given time. Importantly, by periodically comparing the predictive sensor signal with the set crossover position signal in a comparator arrangement, a state of comparison is obtained which is periodically inputted to the program controller so that the controller is able to implement in advance (and at a time corresponding to the lag time) associated functions such as programmed braking of the moving mold member prior to the crossover position or injection screw rotation etc., all in addition to generating the output signal in compensation of the lag time when the comparator senses a change of state indicated by the predictive sensor signal reaching the crossover position.

In accordance with still another aspect of the invention, a method for controlling the molding cycle of an injection molding is provided which includes the steps of a) sensing a plurality of events occurring during the molding cycle and generating sensor signals for the events, at least one specific sensor signal continuously generated before and during a specific event by a continuous sensor; b) inputting the sensor signals and command signals which define the events into a programmable controller; c) periodically evaluating a set of normal equations during a scan of the normal equations by the programmable controller to produce at least a first output signal for a specific physical device associated with the molding machine for controlling a portion of the molding cycle affected by the specific event; d) periodically evaluating a second set of equations utilizing the specific sensor signals to produce a predictive varying sensor signal indicative of a sensor signal estimated to occur at a future set time in place of the then existing sensor signal; e) comparing the predictive sensor signal with a command signal indicative of the specific event; and f) transmitting the predictive sensor signal, when a change in the state of comparison has occurred in step (e), to the programmable controller at the set time prior to the occurrence of the specific event to cause the controller to generate the first output signal at the time the specific event occurs without any lag attributed to the scan time of the controller.

In accordance with a more specific method aspect of the invention, the special event is mold closing and the continuous sensor measures the distance traveled by a moving mold member towards a stationary mold member. Importantly, the second set of equations determines a predicted current moving mold position which is factored an advance time based on the current sensed speed of a moving mold, so that the output signal is transmitted to the physical device at substantially the precise time the crossover position is reached by the moving mold member.

It is another object of the invention to provide a control apparatus for a mold clamp of an injection molding machine which alleviates or substantially reduces mold overtravel.

A general object of the invention is to use state transitions in a programmable controller to control in a timely manner the sequences of a molding cycle.

It is yet another object of the invention to provide a control for an injection molding machine which remains essentially constant in repeatedly performing its control functions despite variations which inherently occur in the molding cycle.

Still another object of the invention is to provide a predictive control for an injection molding machine which determines mathematically for each cycle based on existing conditions which can vary when an event will occur to release a command signal prior to the time the sensor actually senses the event.

It is another object of the invention to provide a responsive control in an injection molding machine which does not use extensive and complex logic programming to avoid or minimize the time spent in processing logic scans of the control.

It is a general object of the invention to provide a control for an injection molding machine in which mathematical functions are applied to a sensor signal to variably predict based on existing conditions when in the future an output or command signal is to be sent to a control on the injection molding machine so that the control is actuated at a precise time in the molding cycle.

It is another general object of the invention to provide a control for an injection molding machine in which mathematical functions are applied to a sensor signal to trigger an output signal at a time which compensates for one or more or any combination of the following:

a) the average response latency in the control;

b) the "jitter" or variations in response latency of the control; and c) the physical characteristics of the machine components which affects its control such as its momentum or stored energy, i.e., momentum of a moving mold member.

A still further object of the invention is to provide in an injection molding machine a feed forward technique to insure consistency and reliability of producing an output signal at the precise time such signal is needed in the molding cycle time.

A more specific object of the invention is to provide in an injection molding machine a feed forward technique utilizing a finite impulse response filter to account for response latency in the control and then utilize a second feed forward technique to account for other molding variables such as overtravel due to the momentum or inertia of the mold.

A still more specific object of the invention is to provide method and apparatus for controlling the mold cycle of an injection molding machine in which a plurality of impulse response filters are employed to predict a plurality of variables which affect the control to provide a more responsive control.

Still yet, a general object of the invention is to provide in any control system utilizing a programmable controller, an arrangement including method and apparatus, for developing a predictive input signal from a sensor signal indicative of actual conditions which is inputted as the sensor signal to the programmable controller at an advanced time and processed by the controller in a conventional manner to generate an output signal without any response latency attributed to the controller or otherwise.

A still more specific but general object of the invention is to provide a programmable controller for controlling a molding cycle by means of state changes triggered by select sensor signals wherein output signals are generated during state transitions to avoid complicated interrupt schemes for controlling critical events.

These and other objects, features and advantages of the present invention will become apparent to those skilled in the art upon a reading of the Detailed Description of the invention set forth below taken together with the drawings which will be described in the next section.

DETAILED DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 12A is a graph substantially identical to FIG. 6 but on a time scale identical to FIGS. 12B, C and D;

FIG. 12B is a chart showing generation of electrical signals at times correlated to FIGS. 12A, C, and D;

FIG. 12C is a time plot of the scans of the programmable controller occurring during changeover from mold fast to mold slow status;

FIG. 12D is a graph of the analog voltage outputted to the flow control valve regulating the speed of the moving mold member;

DETAILED DESCRIPTION OF THE INVENTION

Figure 1:
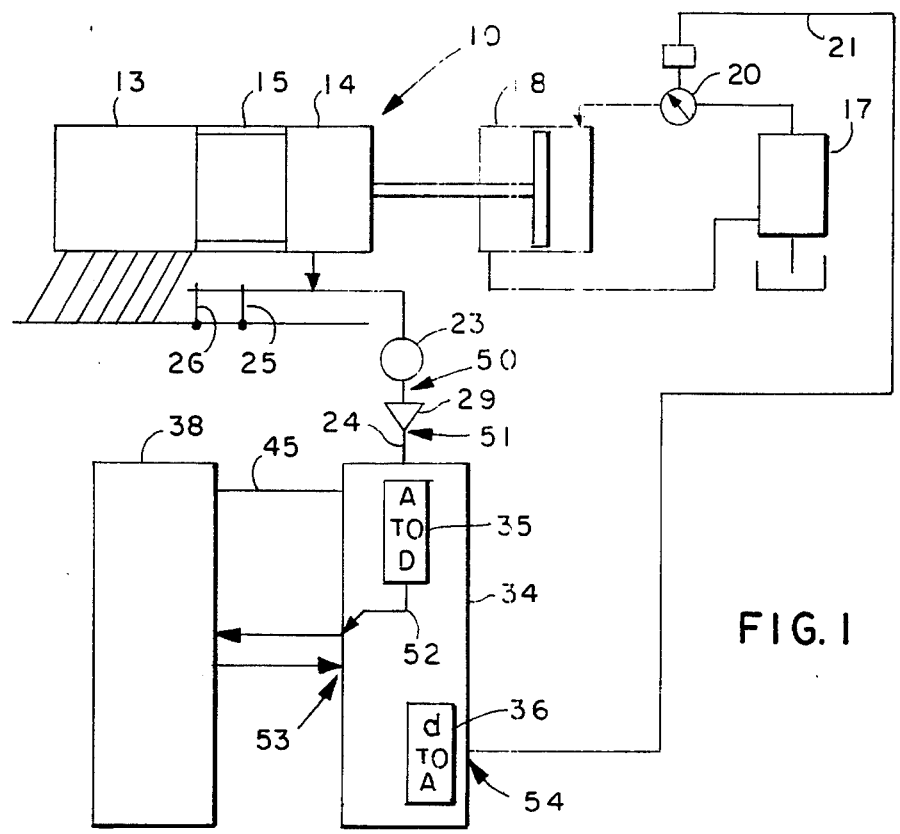
FIG. 1 is a diagrammatic illustration of the components controlling the closing of a mold in an injection molding machine.
Figure 2:
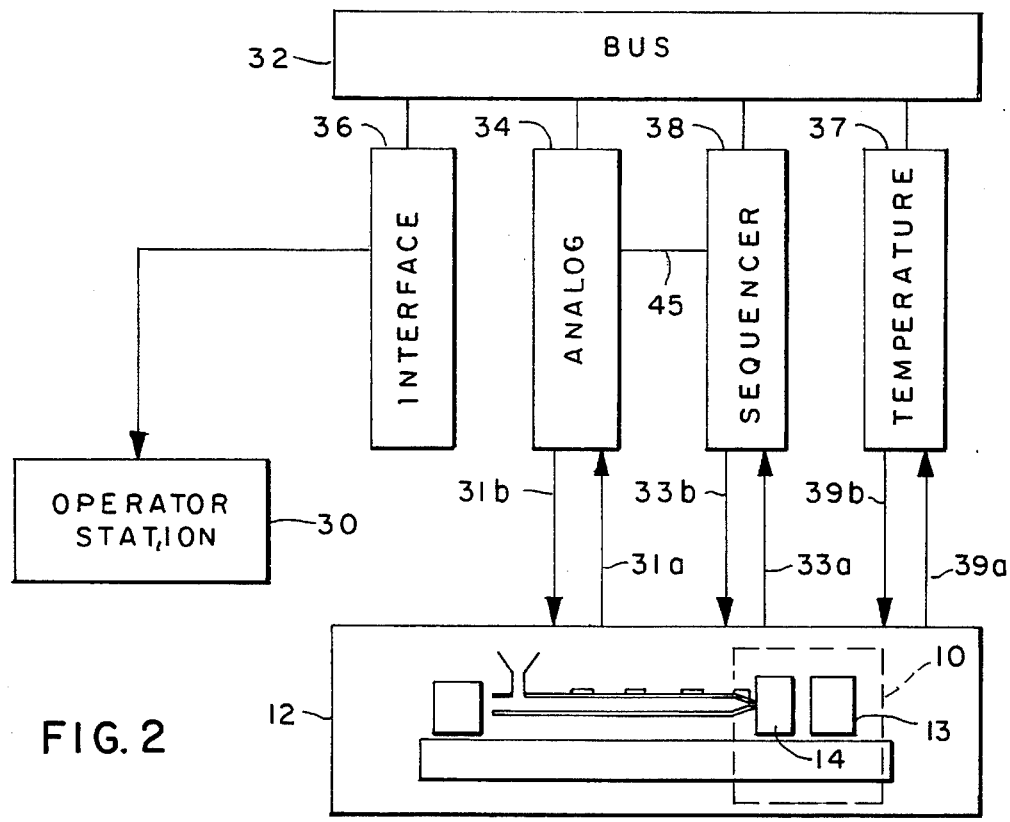
FIG. 2 is a general diagram in block form of the control system of the present invention.

Referring now to the drawings wherein the showings are for the purpose of illustrating a preferred embodiment of the invention only and not for the purpose of limiting same there is shown in FIGS. 1 and 2 a schematic arrangement of the mold clamp 10 of an injection molding machine 12. The principal components of the mold clamp include a stationary mold member 13 and a moving mold member 14 which is movable along tie rods 15 into a clamping-unclamping relationship. A pump 17 on injection molding machine 12 provides the power to displace moving mold member 14. For simplicity and ease of illustration, a hydraulic clamp arrangement will be discussed and this is shown schematically by hydraulic cylinder 18 powered by pump 17 displacing moving mold member 14. Alternatively, a clamp toggle arrangement well known to those skilled in the art, can be utilized in place of the hydraulic clamp arrangement illustrated. The invention disclosed herein will work with either arrangement.

A hydraulic or proportioning flow control valve 20 is provided for controlling the flow of fluid into and out of hydraulic cylinder 18 and therefore the speed and position of moving mold member 14 relative to stationary mold member 13. Flow control valve 20 is actuated or controlled by a variable 0–10 volt analog signal on electrical output signal line 21. Those skilled in the art will understand that pump 17 can be a variable volume pump which obviates the need of a separate flow control valve. In such instance, the controls within the pump regulated by the signal on output signal line 21 acts to control the flow and pressure of the pump. Accordingly, the term "flow control means" when used herein means not only flow control valve 20 but also the controls within a variable volume pump which permit pump 17 to regulate its output.

An electrical sensor 23 attached, in part, to movable mold member 14 provides an electric variable analog signal on a sensor input signal line 24. For ease in drawing clarity a slide wire potentiometer is schematically illustrated. However, any other electrical sensor devices can be used such as transducers, rotary potentiometer for toggle clamp, LVDT, etc. For illustration purposes only a first, adjustable crossover position 25 and a second adjustable crossover position 26 is shown. In practice, the positions simply represent voltages (or current) correlated to position points dialed in by the machine operator at the control console 30.

As is well known to those skilled in the art, an output analog signal from an analog card 34 controls flow control valve 20 and the speed of moving mold member 14 until contact with first crossover position 25 occurs. At that time, sensor 23 inputs analog signal into analog card 34 which causes a sequencer card 38 to send an output signal through analog card 34 to output signal line 21 to flow control valve 20 which reduces the speed of moving mold member 14. When sensor 23 detects second crossover position 26 a signal on sensor input line 24 similarly causes sequencer card 38 to output a signal on output signal line 21 to cause moving mold member 14 to stop. A preset pressure is then applied by pump 17 sufficient to cause tie rods 15 to stretch whereupon the injection stroke in the molding cycle occurs. A similar arrangement likewise applies to a toggle clamp in that the crossover position whereat the mechanism linkage for fast-slow changeover is varied, etc. As thus far described, the arrangement is conventional and typical of existing control arrangements.

Figure 3:
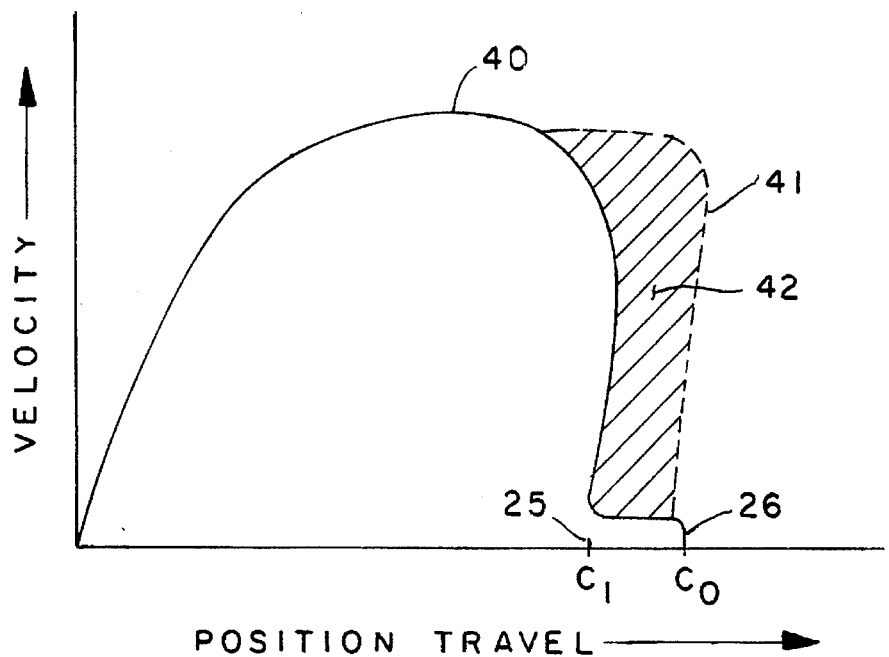
FIG. 3 is a prior art graph of the velocity of the moving mold member as it travels to close against the stationary mold member.

One of the specific objects of the invention is to reduce overtravel of moving mold member 14 so that the time for the mold closing (and by extension the mold opening and eject) can be minimized to optimize the throughput of the machine. This is graphically illustrated in FIG. 3 in which the travel of moving mold member 14 is plotted on the x-axis and the speed of moving mold member 14 on the y-axis. In theory the velocity of moving mold member is shown by solid line designated by reference numeral 40. (For ease in explanation, the velocity at first crossover position 25 is shown to instantaneously drop from the fast velocity, $V_f$, to the slow velocity, $V_s$. Conventionally, flow control valve 20 is variably regulated to cause a deacceleration of moving mold member 14 prior to reaching first crossover position 25 to minimize hunting or hysteresis in the hydraulic system. In the invention, the deacceleration occurs after first crossover position 25 is reached.) In practice, a number of variables act on the control to cause its responsiveness at first crossover position 25 to variably shift towards second or stop crossover position 26. The maximum shift is shown by dash line indicted by reference numeral 41 with the overtravel indicated by crosshatched area 42. Because the shift and overtravel 42 varies from one molding cycle to the next the operator must set first crossover position 25 far enough away from second crossover position 26 to prevent damage to mold halves 13, 14 upon closing. This is the distance shown as $C_o$–$C_1$. Obviously, by reducing this distance, moving mold member 14 can continue its fast rate of travel, thus, reducing the time to close the mold.

Figure 4:
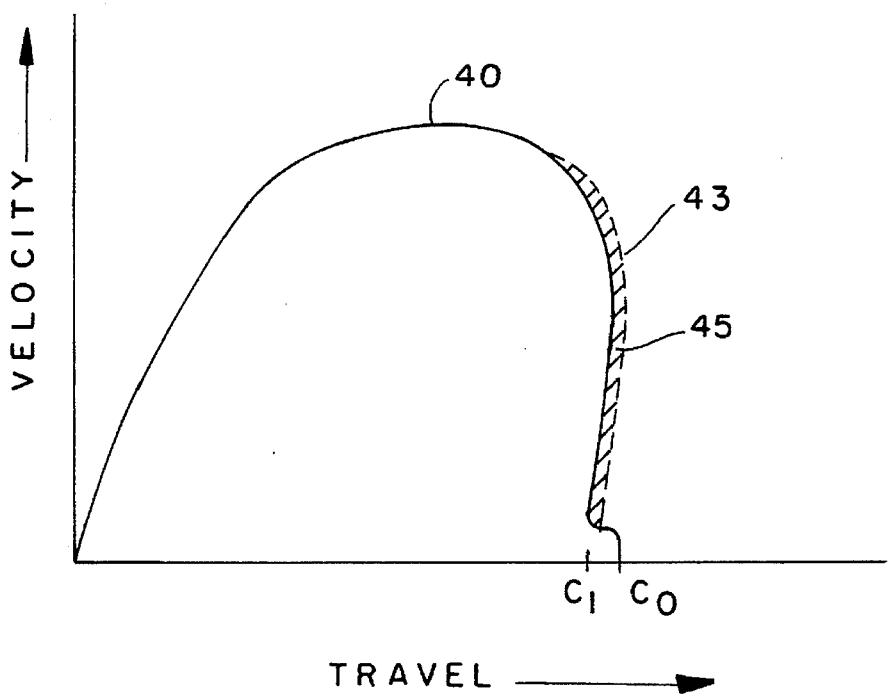
FIG. 4 is a graph similar to FIG. 3 but showing the velocity of the moving mold member when controlled by the system of the present invention.

The operation of the control of the present invention is diagrammatically shown in FIG. 4 in which theoretical curve 40 is reproduced and the overtravel, if any, is shown by dash line 43 and overtravel area 45. The control of the present invention, as will be explained hereafter, can be designed to eliminate the overtravel thus allowing the machine operator to set the first crossover position always at an optimal distance which prevents moving mold member 14 from slamming into stationary mold member 13. The mold closing cycle is thus reduced since the fast stroke portion of the mold closing cycle can be maximized thus reducing the overall cycle time. In fact, first crossover position 25 can be set to coincide with second crossover position 26 to obtain an optimized mold closing cycle in accordance with the invention as explained below.

There are three principal variables which account for overtravel 42. The variables include the momentum of the moving mold member 14 which carries it forward after the signal to stop has been transmitted to flow control valve 20. This variable depends on the machine hydraulics, the mass of moving member mold 14, the speed of moving member mold 14, and other system variables discussed hereafter. In addition, overtravel 42 also includes a variable response latency of the control.

How the variables affect the responsiveness of the control is best illustrated by reference to FIG. 1 and FIGS. 5A through 5F where the time of the response is plotted on the x axis and the number of occurrences at that time for a repeated number of cycles is plotted on the y axis.

Initially the time that the event occurs or the time that first crossover position 25 is reached as determined by sensor 23 physically occurs at the position shown by reference numeral 50 in FIG. 1 and is shown by a straight line on the y axis of FIG. 1A, also designated by reference numeral 50 for convenience, which occurs at time $t_0$. The analog sensor signal thus generated by sensor 23 at time $t_0$ as shown in FIG. 5A is then filtered by a conventional anti-aliasing filter 29 to reduce the high frequency noise before sampling. When the signal passes through filter 29 and reaches the position shown by reference numeral 51 it will have been delayed a slight time, i.e., the time the signal is delayed by passing through filter 29. Further, if a number of cycles are run and the time of the delay recorded for each, it is found that the time of delay will vary. Plotting the delay times of the signal at position 51 will produce a bell-shaped curve, designated for convenience as reference numeral 51 in FIG. 5B. The shape of this curve (and all curves) is shown for ease in illustration as bell shaped. It is appreciated that the actual shape may not be bell shaped, i.e., the distribution may not, and is not in fact, a Gaussian distribution for all events.

For definitional purposes, the average or peak value of curve 51 which occurs at a time indicated as $t_1$ in FIG. 5B is the response latency of the control attributed to filter 29 while the spread (which can be viewed typically as four (4) standard deviations) of the curve 51 is the "jitter" of the control attributed to filter 29. The "jitter" of filter 29 is, for all intents and purposes, almost negligible. However, the "jitter" of other portions of the control may not be negligible, and the effects of "jitter" are cumulative, as will be shown shortly "jitter" adversely affects the control. How it is factored by the invention is one important aspect of the invention.

After the sensor signal passes filter 29, it is converted from an analog to a digital signal in an A/D circuit designated by reference numeral 35 in analog card 34 shown in FIG. 1. When the sensor signal reaches the position shown by reference numeral 52 in FIG. 1, the sensor signal will have experienced a further delay attributed to A/D circuit 35. This delay and the range thereof which is attributed mainly to the non-synchronous discrete time steps of the conversion process is shown by a curve designated by reference numeral 52 in FIG. 5C. The average time delay or response latency is indicated by time $t_2$ which is cumulative because $t_2$ includes the response latency of filter 29 which is $t_1$. The response latency attributed to A/D circuit 35 is the time $t_2$-$t_1$. Similarly the "jitter" of the control attributed to A/D circuit 35 has to be summed with the "jitter" of the control attributed to filter 29 which results in a wider spread and is shown by the dash lines indicated by reference numeral 52' in FIG. 5C.

After the sensor signal is digitized, it is transmitted to sequencer card 38 where the digitized signal acts to cause sequencer card 38 to perform algorithms and logic which generates a digitized output signal corresponding to the slow closing speed of movable mold halve 14 set by the operator at control console 30. As is well known by those skilled in the art, sequencer card 38 performs a number of calculations and logic instructions for a number of machine functions during a scan protocol. When it receives a sensor signal, it proceeds in its scan until it reaches the operative step whereat the mold closing output signal is generated. When the output signal is transmitted back to analog card 34 and reaches position 53 it has been delayed not only by the time it takes the processor to process the algorithm to generate the output signal but also by the significant and random time it takes the scan to reach the position where the algorithm can be actuated (i.e., "jitter"). The time delay attributed to sequencer card 38 is shown by the graph designated by reference numeral 53 in FIG. 5D. The response latency is shown by time $t_3$ which is the cumulative latency of the control to that point. The response latency attributed to sequencer card 38 is $t_3$-$t_2$. Similarly the overall "jitter" of the control to position 53 is designated by the dash curve indicated by reference numeral 53'.

The digitized output signal is then converted to an analog signal in a D/A circuit 36 on analog card 34. D/A circuit 36 causes a further delay by the time the output signal reaches the position shown by reference numeral 54 in FIG. 1. This is plotted by graph 54 shown in FIG. 5E with a cumulative response latency of the control designated by time $t_4$. The overall "jitter" at this position, again attributed to the non-synchronous discrete time steps of the output conversion process, is shown by dash line 54'.

The analog output signal now travels on output signal line 21 to flow control valve 20 which receives the signal and adjusts the hydraulics of the system to slow moving mold member 14. There is of course a delay in flow control valve 20 from the time it receives the output signal until the time it moves the valve. There is also the momentum or internal energy of the system which counteracts the valve. The momentum is variable depending on a number of different factors, but principally the mass and velocity of moving mold member 14. The response latency of the control attributed to system momentum (and valve delay) is shown by curve 55 in FIG. 5F. The overall response latency of the entire control is shown by time $t_5$ with the response latency attributed to system momentum being $t_5$-$t_4$. The cumulative "jitter" is shown by dash line 55'.

The control of the present invention utilizes several finite impulse response filters, each periodically predicting i) the position of moving mold member 14 at a future time, ii) comparing the predicted position to the first crossover position 25 iii) so that the state of comparison as well as other data can be contained in a predictive sensor signal developed by each finite impulse response filter and sent to a programmable controller for processing in a manner defined below. The specifications throughout refer to the inventive concept as utilizing finite impulse response filters which is a technical term given to the meaning of a routine performed typically by a CPU (central processing unit) to modify or filter a signal. The specifications use the term in this manner. The actual device implementing the routine defined as a finite impulse response filter is a CPU.

When the predicted position reaches first crossover position 25 a change in the state of comparison is recorded in the predictive sensor signal status and the programmable controller reacts accordingly. In a conventional controller, the signal is processed as if it were the signal developed by sensor 23 at first crossover position 25. In the control system of the present invention, the signal is similarly treated as the actuating sensor signal but controller changes its state in a manner described hereafter. The future time by which current position of moving mold member 14 is advanced (calculated from its present and past speed) to the predicted position is set for each finite impulse response filter to correspond to any one of several state variables affecting the system. In the preferred embodiment, the variables include the response latency of the programmable controller, the "jitter" of the programmable controller and the time required to overcome the momentum or inertia of moving mold member 14. Each variable has a lag time. In the preferred embodiment, each finite impulse response filter then advances the current position of moving mold member to a predicted position which is the distance moving mold member 14 travels during the lag time and the predicted position is compared to the crossover position etc. Alternatively, the time it takes for moving mold member to reach first crossover position 25 can be calculated by the finite impulse response filter and from that time, the lag (state variable) can be subtracted to establish a predictive crossover position. When moving mold member 14 actually reaches the predictive crossover position, the state of comparison changes and the predictive sensor signal is sent to the programmable controller. This alternative approach, however, is not preferred.

Figure 6:
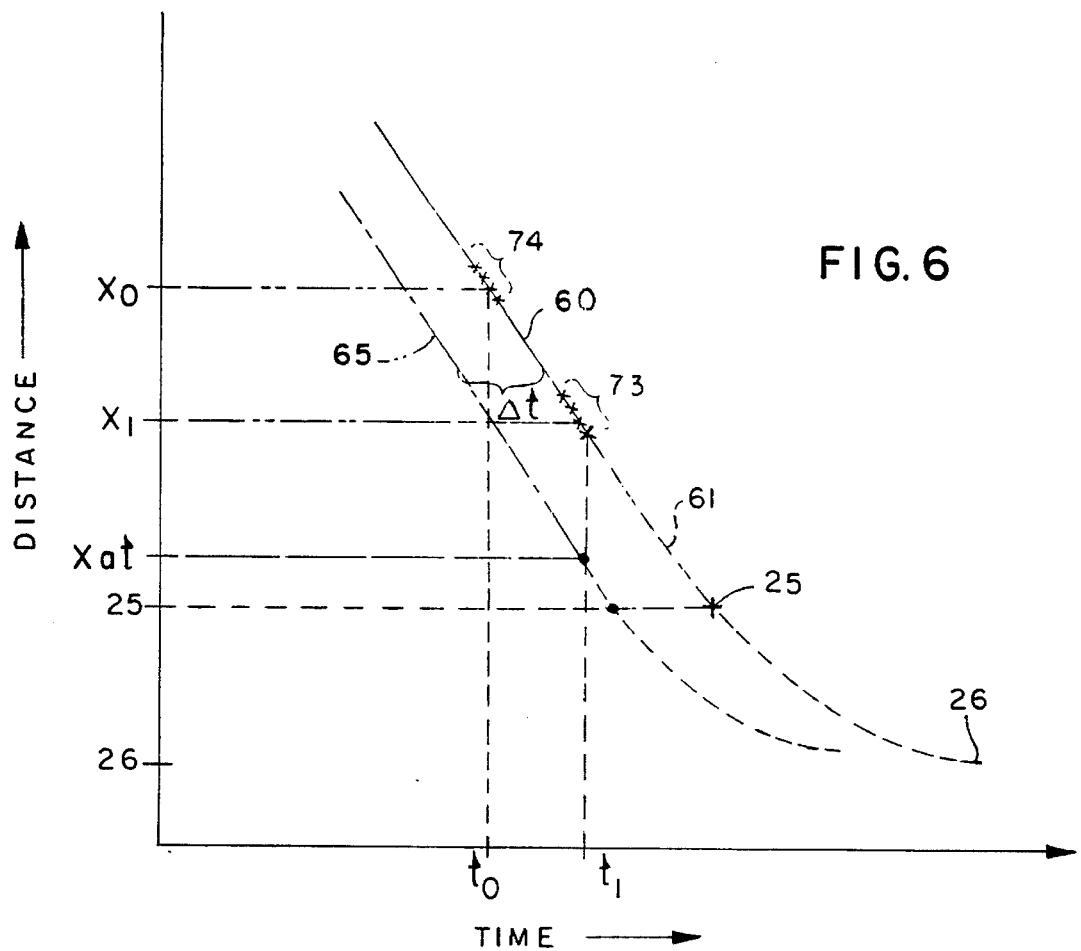
FIG. 6 is a graph showing position and time of the moving mold member as it closes with the stationary mold member.

How this can be accomplished mathematically is demonstrated by reference to FIG. 6. FIG. 6 is plot of the position of moving mold member 14 with the position of moving mold member 14 shown on the y axis and time shown on the x axis. A straight solid line 60 represents the actual position of moving mold member 14 at a particular time in the mold closing cycle. The continuation of curve 60 represented by the dash line indicated by reference numeral 61 is the projected position movable mold member 14 has when it reaches first crossover position 25. The position (for convenience) is graphed as constant and thus curves 60, 61 are straight lines up to first crossover position 25. Those skilled in the art will understand that the velocity could be accelerating or deaccelerating and the algorithms altered to account for a curvilinear curve. However, the initial mold closing action is somewhat constant and is thus depicted as a straight line. As movable mold member 14 continues its travel, solid line 60 will replace dash line 61 until first crossover position 25 is reached.

The mathematics by which the finite impulse response filter calculates the predictive movable mold member position is relatively straightforward. Distance=rate×time. Rate is the slope of solid line 60, i.e., velocity, and can be expressed as:

$$x' = \frac{x_1 - x_0}{t_1 - t_0} \qquad \text{Equation 1}$$

where $x_1$ is the current position of moving mold member 14, $x_0$ is a previous position of moving mold member 14 at time $t_0$, $t_1$ is the time at which the current position of movable mold member 14 is being sensed, $t_0$ is usually 50 milliseconds prior to the current time $t_1$.

The predicted position $x_{at}$ at the advanced time $\Delta t$ corresponding to the lag time (such as response latency) can be written as:

$$x_{at} = x_1 + x' \Delta t \qquad \text{Equation 2}$$

Equation (2) can be rewritten into the following form:

$$x_{at} = \left( \frac{\Delta t}{t_1 - t_0} + 1 \right) \cdot x_1 - \left( \frac{\Delta t}{t_1 - t_0} \right) \cdot x_0 \qquad \text{Equation 3}$$

which, in turn, is the classic finite impulse response filter form of:

$$x_{at} = a_1 \cdot x_1 + a_2 \cdot x_0 \qquad \text{Equation 4}$$

where:

$$a_1 = \frac{\Delta t}{t_1 - t_0} + 1$$

$$a_2 = -\frac{\Delta t}{t_1 - t_0}$$

Thus Equation 4 predicts at the current time the position moving mold member 14 will be at after the "lag" has been taken up. If a graph of a plurality of $x_{at}$'s taken over a period of time were plotted the dot-dash line designated by reference numeral 65 would be generated and line 65 is parallel (assuming constant velocity and accurate sampling) to line 60 representing the actual sensed velocity, but offset or advanced therefrom a time lag equal to $\Delta t$. Line 65 will thus intersect first crossover position 25 at a time, $\Delta t$, earlier than moving mold member 14 actually reaches first crossover position 25. The finite impulse response filter thus takes and advances the input signal to a predicted position which is compared to the actual or set first crossover position 25 and the predicted position is calculated by analyzing the past and current positions of moving mold member over time to determine how far moving mold member 14 will travel during the "lag" of the control or other system variables. It should be appreciated that the calculation is not complex and can be quickly processed by the processor (less than 0.75 milliseconds in the preferred embodiment). This makes the control system responsive and accurate (It should also be understood that whatever "lag" is attributed to Analog card 34, the "lag" is likewise accounted for in the set time or advanced position of moving mold member 14). Again, it is to be understood that the advanced position will vary because the speed will not be constant because of variations in the hydraulic system, wear of machine, etc. Line 60, in fact, will not be a straight line, but will wiggle or snake towards first crossover position 25. This will skew the predicted signal, i.e., line 65, at any given position. By repeatedly calculating the predicted position at short time intervals, the skewing of line 65 is reduced. The predicted signal is more accurate. Each molding cycle is controlled individually based on the actual sensed conditions. Thus the invention is simply not advancing the control a predicted time into the future.

The predictive technique illustrated in the preferred embodiment determines when a moving point intersects a stationary point. Preferably, the moving point is advanced a variable distance depending on sensed conditions to determine when the intersection will occur. Alternatively, the stationary point could be advanced the variable distance to determine when the intersection will occur. For example instead of modifying the input signal and comparing the modified input signal to the set crossover position, it is possible to modify the crossover position and compare the predicted crossover position to the actual sensor signal. An equation for using a modified crossover position would resemble:

$$x_{pcp} = x_{cp} - \Delta t' \cdot x' \qquad \text{Equation 5}$$

Where $x_{pcp}$ is the predicted crossover position advanced a distance equal to that traveled by moving mold member 14 during time $\Delta t$, $x_{cp}$ is the set first crossover position 25.

Equation 5 will reduce to the form of Equation 4.

It is also possible to predictively modify both input and crossover positions and the invention contemplates all such approaches. However, it is preferred to modify the input signal by prediction from a comparison viewpoint, especially when moving mold member 14 is further away from crossover position 25. More significantly, modifying the input signal also lends itself to other conventional control techniques which may be simultaneously or similarly employed such as passing the input signal through bandwidth filters to reduce noise and produce more responsive signals.

For the mold closing cycle of the preferred embodiment, the momentum $\Delta t$ is set at 300 milliseconds, the $\Delta t$ for response latency is set at 30 milliseconds and a $\Delta t$ for synchronization is set at 5 milliseconds. The values of $\Delta t$ will vary for different size machines and different controls. The values for each $\Delta t$ will also be checked and calibrated for each machine during setup. However, the control is responsive only to the actual observed movement of moving mold member 14. It is, of course, recognized that the speed of moving mold member 14 is never precisely constant. Throughout the mold close process, the speed varies somewhat and further the speed will vary from cycle to cycle. Thus, the invention is not simply to set a predictive sensor signal corresponding to $\Delta t$ but to sense existing conditions which includes a varying velocity and establish, on the fly, the predictive sensor signal using Δt. Further, Δt, in accordance with the broader aspects of the invention, need not be set at a fixed predetermined time period, but could be generated by a calculation depending on the current state of the sensed events.

Heretofore, finite impulse response filters have had limited applications to industrial controls and no known applications to prediction in programmable controllers, in part, because of signal to noise ratio constraints attributed to such devices. The invention overcomes this difficulty by first utilizing anti-aliasing filter 29 and then employing a buffer sampling technique which assures sufficient number of measurements to avoid or reduce signal noise and then predicting relatively small time "horizons".

Figure 7:
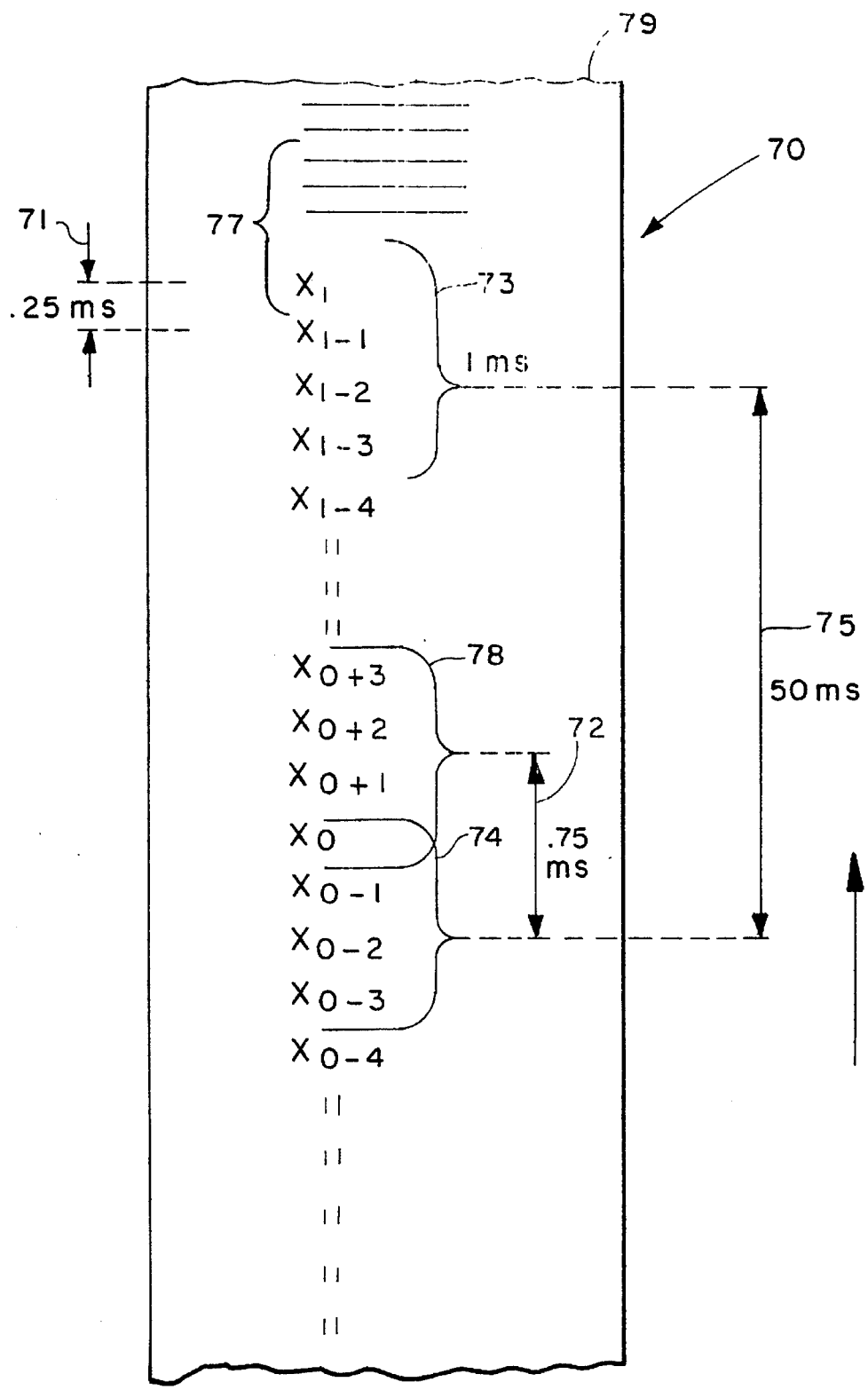
FIG. 7 is a diagrammatic illustration of a buffer sampling scheme used in the present invention.

Referring now to FIGS. 6 and 7, the sampling scheme which reduces signal noise to produce discernible signals will be described further. A buffer 70, diagrammatically illustrated in FIG. 7, stores at given time intervals the sensor signal corresponding to specific positions of moving mold member 14 As discussed hereafter, buffer 70 has a number of channels (eight in the preferred embodiment numbered 79, 79a–g with each channel capable of storing 256 samples), and each channel stores sensor signals from sensors other than sensor 23 for controlling other portions of the molding cycle. In the preferred embodiment, position signals from sensor 23 are stored in channel 79 of buffer 70 as samples at 0.25 millisecond time intervals, shown by reference numeral 71. Every 0.75 milliseconds, buffer samples in channel 79 are read for the $x_1$ and $x_0$ values needed to perform equation 4 to develop the advanced moving mold position which moving mold member travels to in the set time Δt. However, $x_1$ and $x_0$ is determined by reading and averaging 4 adjacent samples (representing a span of one (1) millisecond). This is shown diagrammatically in FIGS. 6 and 7 by sample groupings represented by reference numerals 73 for $x_1$ and 74 for $x_0$. As noted above, $x_0$ (prior measurements) lags $x_1$ by a fixed time, set in the preferred embodiment as fifty (50) milliseconds and indicated by reference numeral 75. Fifty (50) milliseconds was picked as a tradeoff between accuracy of the estimation of x' and the frequency of updating the calculation of x'.

Iterative equation 4 is again performed after the lapse of 0.75 milliseconds, indicated by reference numeral 72 in FIG. 7, to calculate a new advanced position for moving mold member 14 based on the then current position of moving mold member which will, in turn, be determined by averaging the four adjacent sample readings indicated by reference numeral 77 in FIG. 7 and a new $x_0'$ calculated on the average value of four adjacent readings indicated by reference numeral 78 in FIG. 7. (Three of the four samples for grouping 77 are shown as vacant in channel 79 in FIG. 7 since moving mold member 14 has not yet advanced to that position and electrical sensor 23 has not yet generated the sensor signal.) It was discovered that by averaging four samples at small time differentials signal noise for the position measurements and errors resulting therefrom was significantly reduced. Further, repeatedly running the calculation at small time increments produced an accurate reading of the velocity, especially so as movable mold member 14 approaches first crossover position 25. The accuracy attributed to repeatedly performing the calculation was somewhat expected since it is a characteristic of finite impulse response filters. However, the signal noise produced errors rendering the control somewhat unresponsive until sampling a plurality of signals to determine the $x_1$ and $x_0$ positions. Again, the signal noise reduction making the finite impulse response filters signals discernible results because of the relatively simple calculation which can be performed very rapidly by analog CPU 94 thus permitting the rapid (0.75 ms) sampling scheme.

Figure 8:
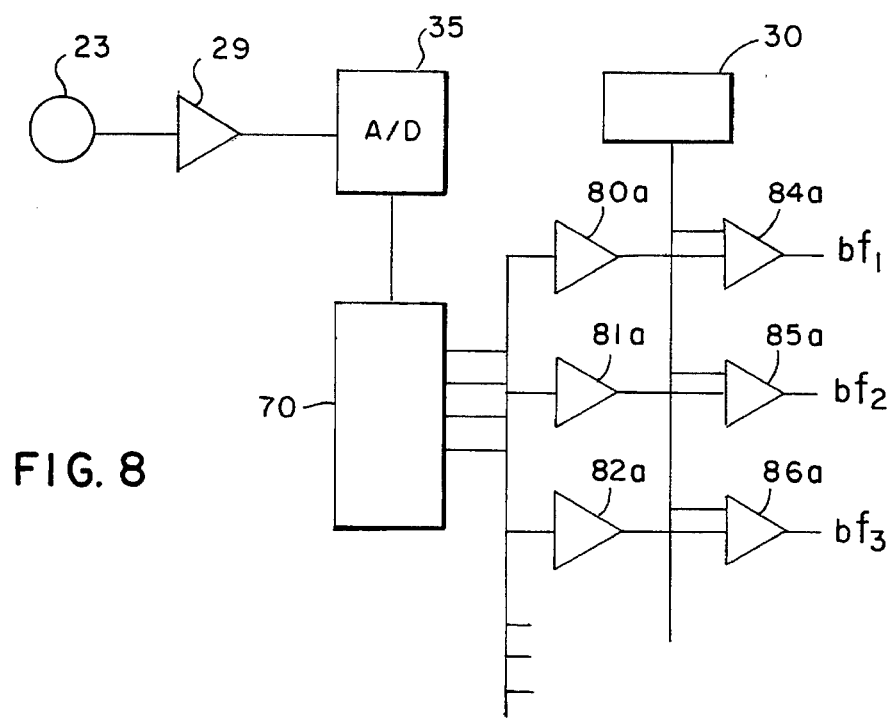
FIG. 8 is a general schematic, in block form, of a portion of the control system of the present invention.

The invention as thus far described can be diagrammed as shown in FIG. 8. Sensor 23 generates a continuous analog sensor signal both before and while a special event (i.e., first crossover position 25) is sensed. The analog signal is filtered at anti-aliasing filter 29 to reduce noise and digitized at A/D circuit 35 to produce a plurality of sensor signals, each of which is being stored in buffer 70. Buffer 70 is periodically sampled as described above and the data sent to a plurality of finite impulse response filters. In the preferred embodiment, and in theory, there is a first finite impulse response filter 80a for predicting the response latency of sequencer card 38 (or programmable controller), a second finite impulse response filter 81a for synchronizing sequencer card 38 and a third impulse response filter 82a for predicting the responsiveness of flow control valve 20, pump 17 hydraulic cylinder 18. Each finite impulse response filter 80a, 81a, 82a will send its predictive signal to its respective comparator 84a, 85a, 86a respectively. Each comparator will compare the predictive signal with a set signal established by the operator at operator console station 30, i.e., first crossover position 25. When the predictive signal equates with the set signal each comparator circuit 84a, 85a, or 86a, as the case may be, will transmit its coded, predictive sensor signal indicative of the happening of a future predicted event to the programmable controller in sequencer card 38. In practice, the time to eliminate variations in response latency will be summed with the average response latency in a manner described below which is a convenient method for accounting for the variations, i.e., "jitter".

Referring again to FIG. 2, the general architecture of the control system for injection molding machine 12 includes a plurality of cards, each carrying one or more CPU's (central processing unit) and each card interconnected to one another through a common rack or bus 32 carrying one or more buses or backplanes. The principal cards or components of the system include an interface card 36 communicating with operator station 30 and with the other system components or cards through bus 32. Other cards include a temperature card 37 for regulating the temperature of the heater bands of injection molding machine 12. Temperature card 37 receives sensor signals on line 39a from sensor devices and transmits output signals on output line 39b to output devices which control the heater bands. Similarly sequencer card 38 receives digital input signals on line 33a from digital sensors on injection molding machine 12 and transmits digital signals on output line 33b to digital output devices on injection molding machine 12 controlling certain machine functions. Analog card 34 receives analog input signals on line 31a from analog sensor devices such as electrical sensor 23 and transmits analog output signal on line 31b to analog output devices such as flow control valve 20. A high speed link 45 interconnects analog car 34 with sequencer card 38. The input and output devices are conventional and include as sensors, potentiometer, transducers, LVDT's, etc. and as output devices, valves, motors, pumps, solenoids etc.

Sequencer card 38 is the programmable controller containing the basic controls or programmable routines which control the molding cycle of injection molding machine 12. The programmable routines do not, per se, form part of the invention although the invention must process the programs to work. The programs are well known to those skilled in the art and can be generated by any skilled programmer. Accordingly, such programs will not be described further herein. Sequencer card 38 receives operator set commands from operator station 30 and various other sensor input signals from sensor devices either directly from line 33a or from other sensors through bus 32 and performs, through its user-changeable programs, a first set or "normal" equations or logic instructions which i) determine the value of certain sensor inputs, ii) perform logic and numeric calculations based on the sensor information which can be time or count dependent, and iii) determine certain output signals based on the sensor inputs which control the molding cycle. The user-definable program of a programmable logic controller (sequencer card 38) must be periodically reviewed or "scanned" so that a) the values of internal variables associated with the input sensor signals can be determined and updated, b) the logical and numeric equations performed with the periodic updated material, and c) the output devices controlled by periodically updated output signals. The manner of the scan is determined by the user-defined program. However, it is conventionally known and accepted that only after the user-defined program is completely scanned or evaluated are the output devices set to the new values. The time for performing the scan cycle depends of course on the complexity of the user-defined program and the speed of the processor. A conventional PLC for a conventional injection molding machines typically requires a scan time of about 25 to 50 milliseconds. As discussed above, when one of the sensors senses an event occurrence (such as first crossover position 25) which then triggers one or more output responses, the lag or response latency can and does adversely affect the mold cycle. Heretofore, one approach followed by the industry has been, fundamentally, to modify the scan cycle when the event is detected to make the PLC respond faster to the event. Thus in Mead U.S. Pat. No. 5,291,391 a special high speed loop or program controlling a select output device(s) is performed outside of the scan of the normal equations when the event is sensed. Basically, the PLC performs a special program controlling a single event which can be done in a short scan of a couple of milliseconds. This type of system as well as other protocol interrupt systems, fundamentally can only reduce, not eliminate, the response latency. Outside of the complexity of such systems, a more subtle problem is introduced by such control systems, which can manifest itself in complex systems such as that encountered in injection molding machines. If certain output devices are early triggered, before the PLC scan is completed, and the early triggered devices affect other devices controlled by the normal PLC scan than the other devices are updated with "old" non-responsive information in the output signals generated during the scan, conceptually requiring two scans of the PLC before responding with updated information. The present invention overcomes all of these problems because, as discussed above, it predicts when the sensed event occurs and inputs a predictive sensor signal of the event into the PLC at an advanced time corresponding to the scan time of the PLC so that the actual event occurs at the precise time the scan is completed. This eliminates the response latency of the PLC and importantly does not adversely affect the programming nor the control of other output devices periodically updated at the completion of the scan.

Figure 5:
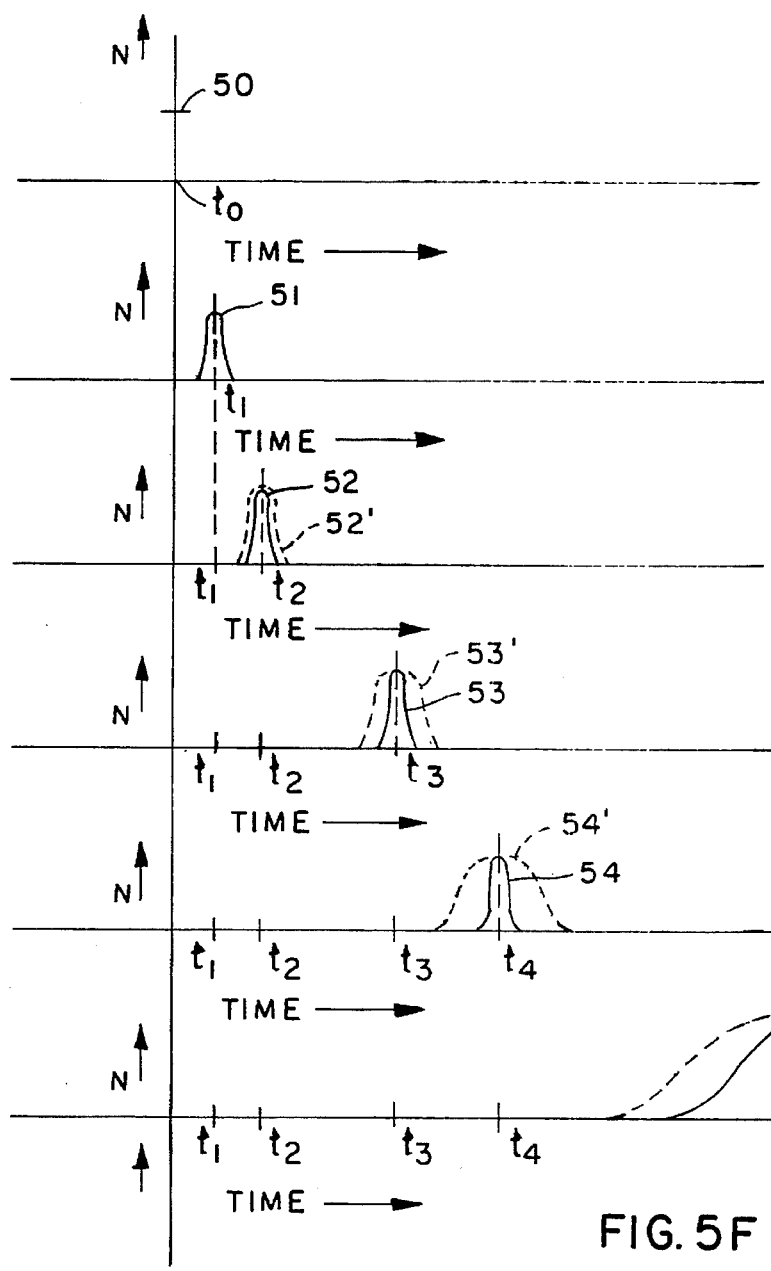
FIGS. 5A, 5B, 5C, 5D, 5E and 5F are each graphs showing the response latency and "jitter" inherent in any control system for various components in the system.

The mathematics for demonstrating a predictive event, first crossover position 25, has been discussed above and generally explained with reference to FIGS. 1, 2 and 5. The position of moving mold member 14 is sensed by sensor 23 and sent as an analog signal to analog card 34 where it is converted to a binary number, compared with a predicted position and the status of which is then inputted to sequencer card 38 which performs a first set of normal equations to develop (among other functions) a binary output signal transmitted back to analog card 34 where it is converted (among other things and/or functions) to an analog output signal regulating flow control valve 20.

Figure 9:
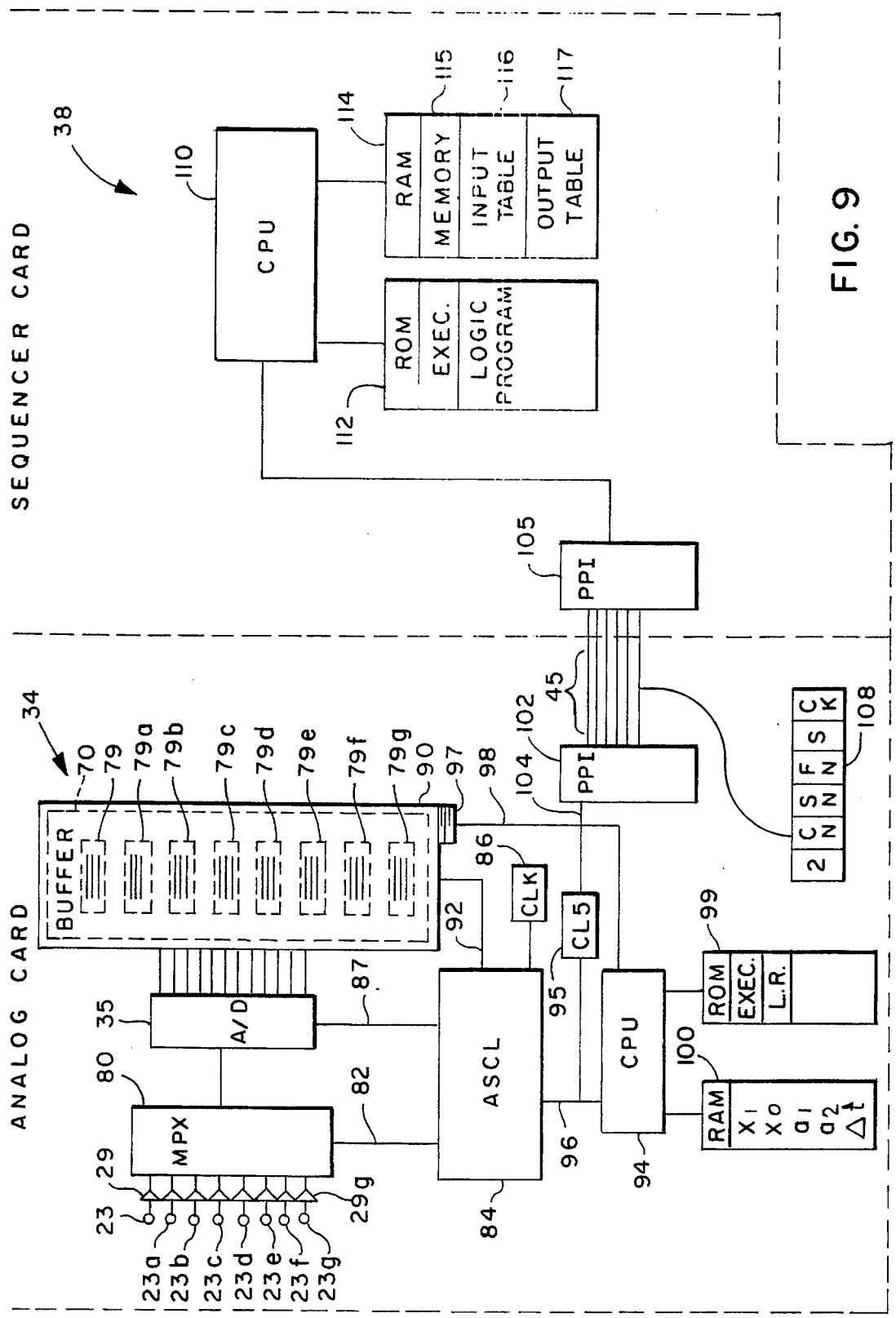
FIG. 9 is a general schematic, in block form, of portions of the analog and sequencer control cards used in the control system of the present invention.

Referring now to FIG. 9, there is shown in schematic form that portion of analog card 34 and sequencer card 38 which performs the control function described above. Analog sensor signal 23 is inputted to a multiplexer 80. In the preferred embodiment, multiplexer 80 can receive up to eight different analog signals designated as 23, 23a through 23g. Examples of other sensor signals received by multiplexer 80 are screw position, eject position, hydraulic pressure, mold cavity pressure, etc.

Analog Scanner Control Logic 84 is conventional (as are all depicted components) and includes programmable logic equations such as "and/or" functions to select and send specific sensor signals 23–23g at appropriate times, duration and sequences through multiplexer 80, to analog to digital circuit 35, and stores the 12-bit digitized samples in the temporary memory buffer 90 as eight (8) groups of buffer 70 data.

The Analog Scanner Control Logic 84 includes, or has associated therewith, a memory address and offset generator, multiplexer channel counter, a scanner state controller, and a clock circuit 86. A/D circuit 35 is controlled through control line 87. Memory buffer 90 is addressed and selected through control line 92. In the preferred embodiment buffer 70 has eight channels designated 79, 79a through 79g with each channel corresponding to a sensor 23 and each channel can sample or store 256 binary sensor signals 89. Typically, the samples are stored sequentially so that sensor 23 signal at a first time is stored as the first sample in channel 79, followed by sensor 23a signal stored as first sample in channel 79a, etc. until all sensor signals for the first time period are stored at the first sample position, and the cycle repeated sequentially storing the second time sample signals in the second sample position. After storing 256 signals, the 257th signal writes over the first sample position. Thus with respect to channel 79, sensor signals are stored every 0.25 milliseconds giving a capacity (0.00025 seconds×256 samples) in excess of 0.06 seconds, which is more than sufficient to calculate the predicted positions. A CPU 94 is provided for controlling Analog Scanner Control Logic array 84 and performing the finite impulse response filter calculations. In the preferred embodiment CPU 94 is a 16/32 bit Motorolla 68000 processor operating at 12 MHZ frequency. CPU 94 in conjunction with a device select circuit 95 establishes processor address instructions on lines 96 to Analog Scanner Control Logic 84 to effect the return of sensor signals from buffer 70. Processor data indicated by reference numeral 97 is read from buffer 70 in accordance with the sampling scheme described above in FIG. 7 on line 98 and the mathematical calculations described above as well as logic functions performed by CPU 94. As is conventional, numeric equations, logic instructions etc. are stored in ROM (read only memory) 99 and variables calculated by the equations such as $a_1$, $a_2$, $\Delta t$, $x_1$, etc. are stored in RAM (random access memory) 100. CPU 94 performs the calculations, determines the present position of moving mold member 14, determines the predicted position of moving mold member 14 corresponding to the response latency of the control (or other variables such as for synchronization, system response), and compares the predicted position of moving mold member 14 with first crossover position 25. CPU 94 then informs a programmable peripheral interface 102 of the state of comparison through high speed link 45. Programmable peripheral interface 102 is also under the control of CPU 94 through device select circuit 95 containing controlling control logic functions on control line 104 that establish a multi-byte, checked sum, interrupt driven protocol which is transmitted to a similar programmable peripheral interface 105 on sequencer card 38.

The protocol signal transmitted from programmable peripheral interface 102 on analog card 34 to programmable peripheral interface 105 on sequencer card 38 is a 6 byte signal or data package designated as reference numeral 108 in FIG. 9 having the following information:

Start of message code (number)
channel number (CN)
Set off number (SN)
Filter number (FN)
State - 0 or 1 (S)
Check sum (CK)

In the preferred embodiment, the protocol signal is the predictive sensor signal advising sequencer card 38 of the status of moving mold member 14 relative to first crossover position 25. The predictive signal has been advanced by a time predicted to equal or exceed that of the response latency of the programmable controller in sequencer card 38 and periodically compared to the crossover position. When the predictive sensor signal reaches the crossover position (which is before moving mold member reaches first crossover position 25) the state of comparison will change (state changes from 0 to 1), the state information will change and sequencer card 38 will now process the predictive sensor signal as if first crossover position 25 has been reached. In addition it is to be understood that the actual sensor signal emanating from sensor 23 and indicative of the actual position of moving mold member 14 is still being compared against first crossover position 25 as it always was. That information (which is not processed by the finite impulse response filter) is sent as an actuating sensor signal with its own protocol or data packet through programmable peripheral interface 102 to sequencer card 38 vis-a-vis high speed link 45. The protocol for actuating sensor signal is different from that of the predictive sensor signal in that the filter number, FN, is assigned a different value by CPU 94. Otherwise, the signals and their scheme for recognition is identical in that both signals are compared against first crossover position 25 to indicate an on-off change of state in the state byte, S, which is 0 or 1.

Sequencer card 38 is conventional and contains its own CPU 110, which in the preferred embodiment is a Motorolla 68000 16/32 bit processor operating at 12 MHZ frequency. CPU has a ROM memory 112 containing the executive programs, logic programs and a RAM memory 114 including a memory storage area 115 for the execute and logic programs, an input table 116 and an output table 117. Input table 116 includes the state of all current input date and comparisons which is as previously described. Specifically, for discussion of the invention, input table 116 contains the predictive sensor signal and the actuating sensor signal inputted to sequencer CPU 110 through sequencer programmable peripheral interface 105. As analog card 34 periodically generates the signals, and indicates within the signal whether the state has or has not changed, input table 116 is likewise periodically updated. Output table 117 contains the output signals in binary form periodically generated by sequencer CPU 110 performing or evaluating a "normal" series of numeric and logic instructions stored in a logic program 118 of ROM 112 which also contains the execute program language stored in an exec. program 119. As indicated, the resulting output signals generated by CPU 110 performing logic program 118 are periodically placed in output table 117 from which certain output signals (such as those regulating flow control valve 20) are transferred back through a programmable peripheral interface (not shown) and high speed link 45 to analog card 34. When reading analog card 34, the binary signals are converted to analog signals in D/A circuit 36 (FIG. 1) also under the control of programmable gate array 84 and analog CPU 94 in a conventional manner so that it is not shown or described further herein. Other output signals are transferred by sequencer output line 31$b$ to digital output devices (not shown) while other output signals reach operator station 30 through interface 36 and bus 30.

As thus far described, the invention can function in any conventional programmable controller to control the molding cycle of an injection molding machine using conventional logic. The predictive sensor signal will generate an output signal for a select output device which will arrive at the output device just as the actual event occurs. To insure the arrival of the output signal to the output device "just-in-time" the output signal can pass through a gate circuit or control which opens when it receives the actuating sensor signal. In this manner, early arrival of the output signal is prevented. The actuating sensor signal does not pass through the scan effected by sequencer CPU 110. However, the invention does not contemplate using conventional control logic to control the molding cycle. The invention contemplates that the molding cycle will proceed by passing through a series of states, each state executed by sequencer CPU 110 periodically evaluating or scanning a series of equations in each state.

Figure 10:
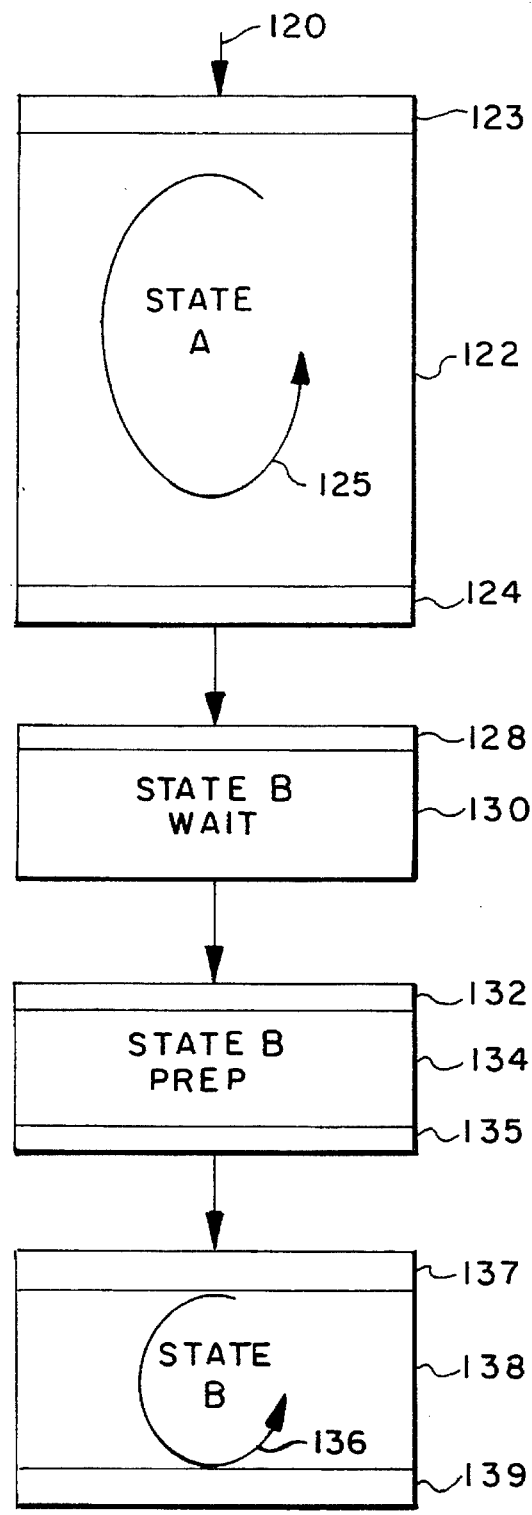
FIG. 10 is a block diagram of the state transition logic generally used in the present invention.

This is generally illustrated in FIG. 10 where there is shown in block diagram the state transition from a state A to a state B which proceeds or is processed in the direction of arrow 120. Block 122, indicative of current state A contains a number of numeric and logic equations and corresponds to ROM logic program 118. The equations in state A block 122 which can be viewed as a first set of normal equations are processed sequentially in a scan indicated by arrow 125 which takes some time, $\Delta t$, to perform. Inputs are read into logic A block 122 at 123 from input table 116 and outputs are read out of logic A block after performing scan 125 at 124 into output table 117. In accordance with the broad scope of the invention, the predictive sensor signal can be assumed, because of the sampling technique and calculations discerned above, to be the exact equal of the actual sensor signal. Accordingly since the predictive sensor signal is advanced $\Delta t$, when state A scan 125 is complete the output signal is read out at the completion of the scan and state B is entered. At that time, state A stops execution. The control is in state B which has its own second set of normal equations in scan logic block 136.

As indicated, flow diagram of FIG. 10 is processed in the direction of arrow 120 in which state A is scanned in state A logic block 122 and output signals generated periodically and written out at 124. When predictive sensor signal is sensed there is a transition from state A to state B at the completion of scan 125 in state A logic block 122. The predictive sensor signal causes a state change written out at 124 and causes execution of state B to commence either through state wait block 130 and state prep block 134 or through state prep block 134. Wait block 130 is basically a synchronizer/fail safe device. It holds flow control output signal from state A until the actuating sensor signal is received and read in at read portion 128 of wait block 130 whereupon it is transmitted to read in portion 132 of a prep block 134. Actuating sensor signal is technically not processed by any CPU scan. Wait block 130 contains a counter or timing circuit (not shown) which counts the time it takes to receive the actuating sensor signal after the flow control output signal is received from state A and if prep block 134 does not receive the actuating sensor signal within an estimated time, there is an indication something has gone awry. In such event, wait block 130 prevents transmission of the output signal to state B prep block 134 and control is returned to state A. Assuming the actuating sensor signal has been received within an appropriate time the output signal is transmitted into read in portion 132 of prep block 134 which writes the flow control valve output signal to a read out block portion 135 where it executes a change in the analog voltage sent out at D/A circuit 36 to flow control valve 20. Also, state B logic block 138 execution begins and state B scan 136 is instituted. Thus, there is a very precise, definite start time of the new state.

It is understood by those skilled in the art, that the normal "state A" routine, as initially indicated above is to contain the logic for the complete molding cycle, starting from the time the mold is open, to mold close, inject, recover, mold open and eject. Each of these functions, in turn, has a number of additional steps and some functions interrelate to one another. Thus, when the timing of any one event had to be especially controlled, special interrupt routines and the like had to be especially developed. The CPU had to cycle between routines, recognizing certain commands to take a special event off line and do a special calculation then somehow updating the general scan with the off-line controller event. All of the approaches resulted in faster responding controls to certain events but did not reduce the lag time to zero, nor can they, practically speaking, result in a timely update of the general scan.

The invention utilizes an entirely different approach based on different states and state transitions. Generally speaking, the molding cycle starts in state A. When an event is sensed, it switches to another state, state B, and depending on what happens in state B, there will be further transitions to a number of other states. The scan time for each state is faster than the scan time for all states which makes the control more responsive considering, if nothing more, the scan time. This fundamental approach represents an improvement to the prior art. However, the material advancement is the use of predictive sensor signals to cause the state transition coupled with a very precise, definitive state change. For example, state A, the fast closing mold speed, is changed to state B, the slow closing mold speed, by a predictive sensor signal which causes the state transition and moves the system out of state A before the sensor generates the event signal. Then, the wait block concept is used to initiate the state B scan. However, at the time the scan of state B is instituted the prep block has outputted the flow control valve output signal. Thus, state B scan 136 starts with completely updated information and it precisely starts vis-a-vis prep block 134. Similarly, predictive sensor signals are employed to affect a change from state B to another state. State A no longer executes. There no longer is a problem with updating state A with information resulting from the special events pulled off the processing scan.

Figure 11:
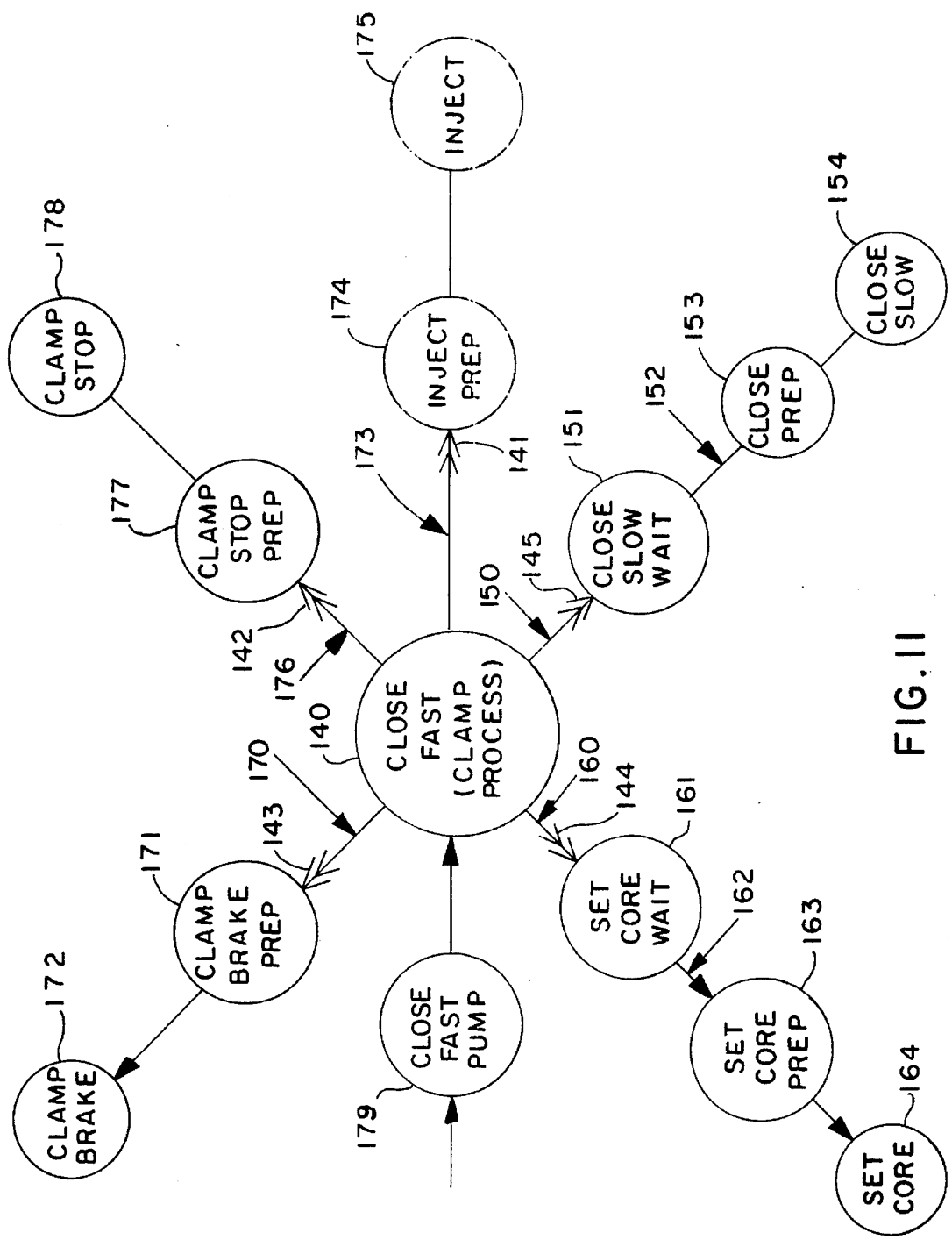
FIG. 11 is a block diagram of the state transition logic use in the preferred embodiment of the present invention.

This may be made more clear by referring to FIG. 11 which shows in block form the state transition logic related to the mold close portion of the molding cycle and to which the preferred embodiment of the invention relates.

In FIG. 11 there is a clamp process logic block 140 which contains the instructions for all functions related to clamp closing. Clamp process logic block 140 can be viewed as state A. The clamp functions are each diagrammed in block form and follow the logic path arrows indicated by arrow reference numerals as follows:

i) reference numeral 141 tells the molding machine to inject because the mold is closed;

ii) reference numeral 142 tells the machine to stop mold closing because certain switches have not been set or valves opened;

iii) reference numeral 143 sets forth a logic which tells the machine to brake moving mold member 14 because moving mold member 14 has reached the closest position to stationary mold member 13 it can have without impact;

iv) reference numeral 144 tells the machine to set any cores in the mold if required; and v) reference numeral 145 tells moving mold member 14 to slow down because it has reached crossover position 25.

The clamp process logic instructions in block 140 are contained in logic program 118 and are processed in a scan of logic program 118 or referring back to FIG. 10, they are processed in state A logic block 122. Each of the logic paths 141–145 indicate a state transition to another state, i.e., state B in FIG. 10. The logic code with comments for clamp process logic block 140, with comments, is reproduced below:

| Instruction | Comment: |
| --- | --- |
|  | Example Clamp close logic. This is simplified processing block for clamp closing logic. It is repetitively run until a state command changes the current state. At that time the new state's wait block, then its prep, and then its processing block are run. |
| BLOCK CloseProcess; | |
| Call AsynchLogic; | *Tasks which be run in all states. |
| IFC {LD inGateClose, AND crClampTopClose;}, | *Check for front gate *and push button control relay |
| STATE atClampStop, | and Exit to sudden stop if lost (ref. num. 142) |
| ENDIF; | |
| IF {LD lpCoreSetPos.app. AND crSetCoresOnFly;}; | *Are we nearing core set pos. *Do we want to set cores |
| STATE StSetCores; | *then set cores (ref. num. 144) |
| ENDIF; | |
| IF lpModeCloseSlow.app; | *are we nearing close slow setpoint |
| STATE stClampCloseSlow, | *then go to close slow state (ref. num. 145) |
| ENDIF; | |
| IF lpMoldIsClose.in300ms | *If you are within 300 ms of full close |
| STATE stClampBrake | *then decelerate the clamp (ref. num. 143) |
| END IF | |
| IF lpMoldIsClosed.at; | *are we at mold closed |
| STATE stInject | *then begin injecting (ref. num. 141) |
| END IF | |
| ENDBLOCK | |

The preferred embodiment is shown to occur in state transition logic path 145. In accordance with the clamp process program instructions above for clamp logic block 140, when the predictive sensor signal is received, (shown by reference numeral 150 in FIG. 11) the logic instruction, "linear position close slow—approaching", is implemented and the control moves out of state A into state B and the logic in a close slow wait block 151 is implemented. The logic executed for close slow wait block 151 may be written as follows:

| Instruction | Comment |
|---|---|
| | Example Wait Block for CLOSE SLOW STATE. This block is run until the actual position is met to synchronize the output of the solenoids and analog valve signals with the input signal. |
| BLOCK CloseSlowWait; | |
| CALL CheckSafety; | *have we lost a safety condition |
| IF lpCloseSlow.at | *are we at the actual position |
| { | |
| WAIT EXIT; | *then proceed on to write out changes |
| } | |
| ENDBLOCK; | |

As indicated from the instructions for close slow wait block 151, the CheckSafety instruction is the timing/fail safe feature discussed above. When the actuating sensor signal is received (indicated by reference numeral 152 in FIG. 11) the output signal is released from wait block 151 and transmitted to a close slow prep block 153 which contains the logic instructions to output the signal for the close slow state. The logic instructions prep block 153 may be explained as follows:

| Instruction | Instruction |
|---|---|
| | Example Prep Block for CLOSE SLOW STATE. This block is run once the close wait block is completed. |
| BLOCK CloseSlowPrep; | |
| LD 1; | |
| STO so1RG | *write out some solenoids |
| STOC so1GG2 | |
| MOVE aoutCloseSlow; | *and execute a change in the analog voltage |
| ENDBLOCK | |

Once the logic in close slow prep block 153 is complete (and the analog signal for flow control valve 20 sent), simultaneously the logic for close slow block 154 is processed by a scan of the instructions contained therein. Close slow block 154 corresponds to state B logic block 138 described in FIG. 10. It contains the same instructions as those for clamp process block 140 set forth above, or alternatively, the same instructions less those covering slowing moving mold member 14 on path 145. (Alternatively, it can contain an entirely different set of instructions which occurs, for example, in the inject flow block.) State B is now being scanned for an event to trigger another state.

As noted above, $\Delta t$ is set to be equal to or greater than the time "lag". Response latency is defined as the "average" time lag. "Jitter" is defined as the spread of the lag. In the preferred embodiment for the close-slow logic path 145, $\Delta t$ for the response latency is set to be greater than the response latency value a time long enough to account for the "jitter". The lag varies from scan to scan but by inputting the predictive sensor signal 150 at a time sufficient to account for all such variations, close-slow wait block 151 synchronizes actuation of close slow prep block 153 with actuating sensor signal 152 to account not only for response latency but also for any variation on a cycle by cycle basis.

A similar approach is followed to set the cores in the mold. As indicated and discussed with reference to FIG. 9 other predictive sensor signals and actuating sensor signals i.e., 23a, 23b, etc., can be developed and used in accordance with the invention and the core set logic path 144 in FIG. 11 is such an example and parallels that of changing mold closing speed described for the preferred embodiment. In this alternative embodiment, a predictive sensor signal at the core station appraises the core set position and is advanced to occur in time before the cores are set on the fly while an actuating sensor signal indicating that the cores are fully set (and preferably developed from the same sensor, i.e., 23a), is also developed in a similar manner as that discussed for changing the speed of moving mold member 14 above. Core setting thus follows another state transition along state transition path 144. State A represented by clamp process logic block 140 changes to state "C" represented by a set core logic block 164. Thus a coded predictive sensor signal for the core set function (protocol signal member has a different channel number) indicative of the "linear position of the core set position appraised" and carrying with it the instruction to set the cores on the fly shown by reference numeral 160 is inputted in advance time to clamp process logic block 140, which upon completion of its scan, sends its output signal to state "C" vis-a-vis a set core wait block 161. Set core wait block releases its instructions that the cores are set when it receives an actuating sensor signal indicative of the command "linear position core set position at" to set core prep block 163 which in turn causes actuation of associated output devices. Simultaneously set core block 163 causes execution of logic in state "C" set core block 164 which is identical to the logic of clamp process block logic 140.

It is not necessary to have a wait logic block (i.e., state B wait block 130 in FIG. 10). However it is preferred to use a prep logic bloc (i.e., state B prep block 134 in FIG. 10). This is demonstrated in the preferred embodiment by considering the logic used on logic path 143 which insures braking of moving mold member 14 when it reaches a position within 300 milliseconds of stationary mold member 13 traveling at its current fast speed. In this instance there is no actuating sensor signal. If the predictive sensor signal senses the condition, the control will change from state "A" to effect clamp braking in state "D" by executing state "D" clamp brake logic block 172. Accordingly, the predictive sensor signal for mold momentum (i.e., 82a, $bf_3$ in FIG. 8) shown as reference numeral 170 in FIG. 11 and carrying an instruction "linear position mold is closed in 300 ms" is read in state A clamp process logic block 140 and outputted to state "D" vis-a-vis a clamp brake prep block 171 carrying instructions to start mold braking and executing logic instructions contained in state "D" clamp brake logic block 172. Clamp brake logic block 172 contains the same instructions as clamp process logic block 140.

Completing the description of the clamp close process disclosed in FIG. 11, there is also under control of clamp process block 140 the beginning of the injection of molding material which is controlled by the injection logic flow path 142 and which starts when moving mold member 14 and stationary mold member 13 are closed as sensed by sensor 23. In this flow path, a predictive sensor signal is not inputted to state A to cause a transition to the inject state, i.e., state "E" contained in an inject logic block as 175. The actuating sensor signal indicated by reference numeral 175 is inputted to state A logic process block 140 to cause an output instruction such as "linear position mold is closed.at" to be inputted to an injection prep block 174 containing logic or instructions to start injection and simultaneously starts inject process logic shown in injection block 175. The logic in injection logic block 175 contains a second set of normal equations which are different from those of clamp process logic block 140. Finally, as a safety precaution and to prevent mold damage if certain gates are not closed or moving mold member 14 is too close to stationary mold member 13, actuating sensor signals indicative of such conditions shown by reference numeral 176 cause a change of state from clamp close process block 140 to a clamp stop state, i.e., state "F" indicated by clamp stop logic block 178 vis-a-vis an instruction such as "InGateClosed" or "Clamp tooClose" inputted to a clamp stop prep block 177 containing logic or instructions to stop moving mold member 14 and execute the state "F" logic instructions contained in clamp stop logic block 178. Also the concept of state transition vis-a-vis a prep block containing the instruction to activate another state can be used to trigger the state A clamp close process block 140 and this is shown in FIG. 11 where a signal indicating that moving mold member is traveling fast implements a close fast prep block 179 and, in turn, the logic in clamp process block 140.

In summary, FIG. 11 shows a spider web progression in which the molding cycle is controlled by sequencer CPU 110 scanning a first condition state which is indexed to a second state when any one of a number of specific input sensor signals are detected. During the second state the output instructions are first executed and the second state then scanned. The second state may contain the same logic instructions as the first state or the instructions may be different. Thus, the complex logic or equations utilized by prior art interrupt schemes is completely eliminated. Importantly, by triggering the state transition by a predictive sensor signal, control time "lag", or system time lag can be eliminated. Finally, by synchronizing the transition to the second state with the actual event, a reliable and predictable control results preventing early execution and sharp or precise state transitions.

The operation of the preferred embodiment insofar as it relates to speed changeover at first crossover position 25 may now best be explained by reference to FIGS. 12a, 12b, 12c and 12d which show the state transition by a series of graphs plotting the event as function of time on the x-axis at a scale which is common to all figures. FIG. 12a for all intents and purposes is identical to FIG. 6 and plots position on the y-axis. Actual position of moving mold member 14 detected by sensor 23 is shown as solid line 60. Solid line 60 intersects at first crossover position 25 at time t'. Dash line 65 is parallel to solid line 60 and offset therefrom a time Δt as discussed above. The Δt time is 30 milliseconds for the preferred embodiment. Dash line 65 is the predictive sensor signal derived from sensor 23 and intersects first crossover position 25 at an earlier time t. FIG. 12B shows the transmission of the signals from and to analog card 34 and sequencer card 38 vis-a-vis high speed link 45 with the strength of the signal plotted on the y-axis. At time t predictive sensor signal 180 is inputted from analog card 34 through programmable peripheral interface 102 to input table 116 in sequencer card 38. At time t' actuating sensor signal 181 is inputted from analog card 34 through programmable peripheral interface 102 to input table 116 in sequencer card 38. A couple of microseconds later, at time t" (exaggerated for clarity in the drawing), an output signal 183 is inputted from sequencer card 38 through a programmable peripheral interface vis-a-vis high speed link 45 to analog card 34 and therefrom to flow control valve 20.

FIG. 12C plots the output signals generated by sequencer CPU 110 when completing the scan of logic program 118. The scan time is thus portrayed as blocks 185 and progressively numbered as 185a–185g in FIG. 12C. Blocks 185a–g have a processing state indicated as "A" or "B". Processing state "A" in FIG. 12c is state A shown in FIG. 10 or state A represented by clamp process logic block 140 in FIG. 11. Thus sequencer CPU 110 is processing the state as a fast moving mold member state. Sometime during the scan designated as 185C predictive sensor signal 180 is generated and predictive sensor signal 180 has to wait before being placed in input table 116 until sequencer CPU 110 completes the 185C scan. At the time CPU 110 starts the next scan which is scan 185D, predictive sensor signal 180 is placed in input table 116 and a change in signal (from "0" to "1") is processed during the 185D scan. At the start of the next scan, 185E, state A ends and state B begins execution of the wait block which is state B wait block 130 in FIG. 10 and close slow wait block 151 in FIG. 11. Wait block 151 is in turn scanned but very rapidly and the scan of wait block 151 is shown by arrows 187. Actuating sensor signal 181 is now inputted to wait block 151 which completes its scan upon receipt of actuating sensor signal 181 (instruction "linear position close slow.at") and begins state B prep block which is state B prep block 134 in FIG. 10 and close slow prep logic block 153 in FIG. 11. The time for close slow prep logic block 154 to execute and send the digitized signal to D/A circuit is in the microsecond range and is indicated by reference numeral 188 in FIG. 12C. This occurs at time t". State B logic is now processed by a scan of the logic instructions contained in stage B logic block 138 in FIG. 10 and close slow logic block 154 in FIG. 11 and shown as scans 185E, 185F, 185G. Because the instructions for state B are the same as the instructions for state A (in the preferred embodiment), all scans 185A–G take the same time. The analog output voltage is shown in FIG. 12D where the fast close output voltage is shown by line portion designated 190 and the slow close output signal is shown by slow line portion designated 191. As previously indicated, at first crossover position 25, moving mold member 14 is not instantaneously slowed but predictively braked to its slower speed 191 and this deceleration is shown by line portion 192. The deceleration starts at time t" which is offset several microseconds from the actual crossover time t' which has no effect on the molding cycle. If it was desired to eliminate the several microseconds, this could be simply done by filtering actuating sensor signal 181 but this is not necessary.

Figure 13A:
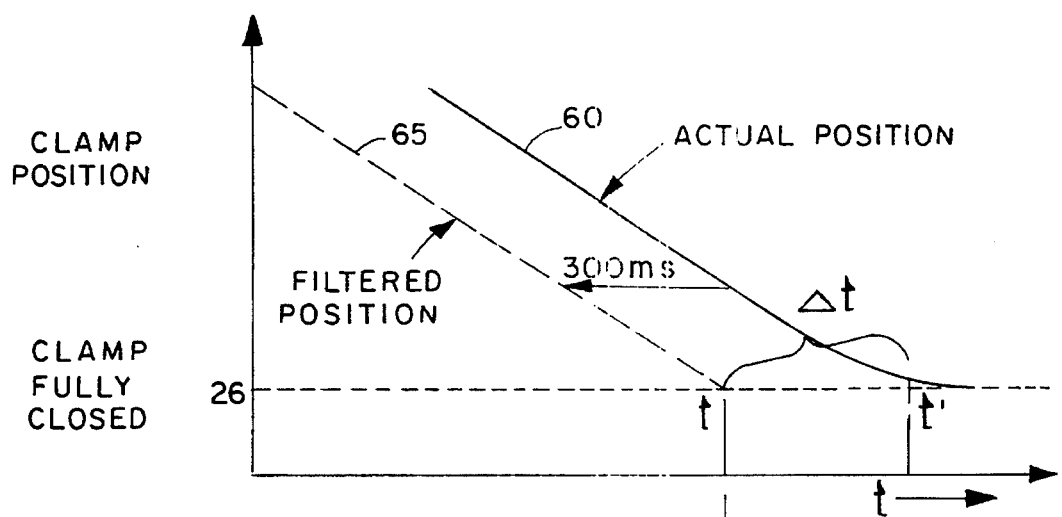
FIG. 13A is a graph similar to FIGS. 6 and 12A but showing the sensor signals generated at the mold stop crossover position.
Figure 13B:
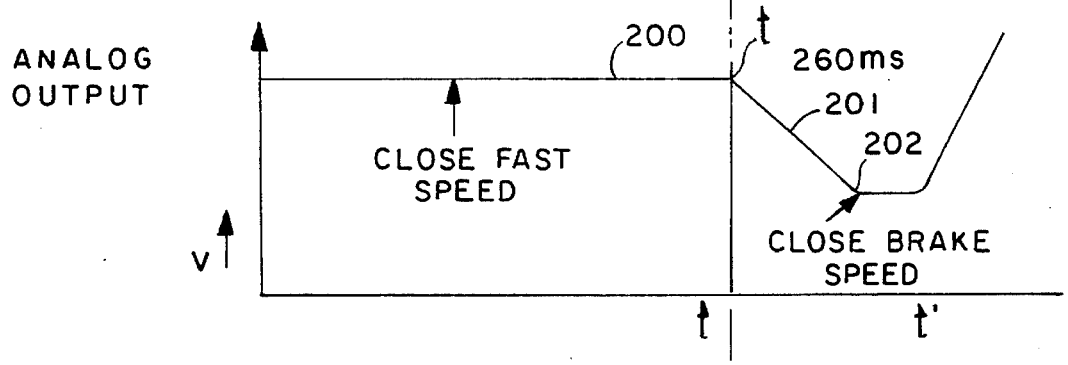
FIG. 13B is a graph similar to FIG. 12D but showing the analog voltage outputted to brake the moving mold member.
Figure 13C:
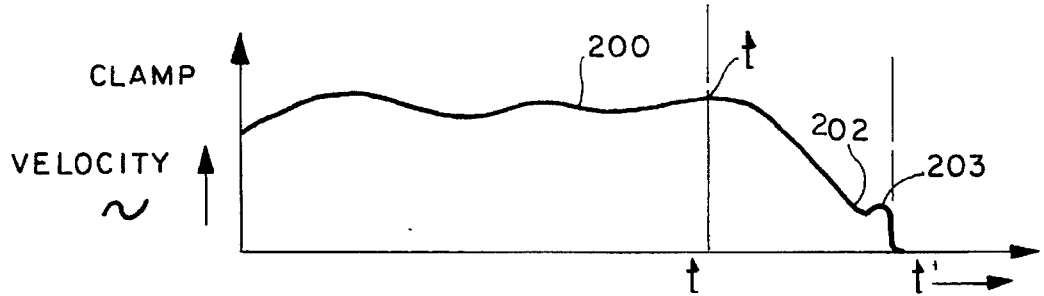
FIG. 13C is a graph of the velocity of moving mold member when predictively braked in accordance with the analog voltage applied to the flow control valve in FIG. 13B.

FIGS. 12A, B, C, and D should be compared to FIGS. 13A, 13B and 13C which similarly illustrate how the clamp braking logic flow 143 diagrammed and discussed with reference to FIG. 11 works. In clamp braking there is no wait block. The predictive sensor signal simply triggers clamp brake prep block 171 for execution of the analog command. FIG. 13A again shows FIG. 6 with the actual position of moving mold member 14 shown by solid line 60 and the predictive position shown by dash line 65. The clamp fully closed position is shown by reference numeral 26 indicating second crossover position 26. The time by which the moving mold position is advanced, Δt, is set at 300 milliseconds for reasons explained above. If the state change for predictive sensor signal is sensed at time t, state A changes to state B and the transition is effected by execution of prep block 171 which actuates the brake output signal. This is shown in FIG. 13B where the analog output signal regulating flow control valve 20 at the close-fast speed indicated by line portion 200 immediately goes into a predictive braking mode where moving mold member is decelerated to "stop" voltage, shown by curve portion 201, over a time arbitrarily set at 260 milliseconds which is shown by reference numeral 202. When stop position at time t' is reached the analog voltage is increased to stress the tie rods as explained above. The reason for braking over a time span of 260 milliseconds while the predictive sensor signal is set at 300 milliseconds is best shown by FIG. 13C which plots clamp velocity on the y-axis. At time t, the time of the predictive sensor signal state change, the velocity decreases to a time corresponding to position 202. However the inertia of moving mold member 14 carries it forward, as indicated by the "blip" 203 before the braking can take hold and stop moving brake mold member 14. The forty millisecond additional time period allows for this internal energy or inertia carry forward. Not shown in FIG. 13 are the time scans corresponding to the "0" and "1" states shown in FIG. 12B. If scan blocks were drawn for FIG. 13, they would simply proceed from a state A "0" state to a state B "1" state. When the predictive sensor signal is inputted to sequencer 34, it will be delayed until the state A scan being processed is completed. The next state A scan will input the predictive sensor signal which at the completion of that scan will output the signal state B vis-avis to the transition prep block 171, etc.

Particularly pertinent features of the invention can be generally summarized as follows:

A) A state change methodology is used in programmable controller CPU 110 for sequencer card 36. Instead of a scan of a set of "normal" equations using a ladder logic which contains the entire molding cycle, the scan by CPU 110 is progressed through a set of "normal" equations indicative of that particular state in which the molding cycle is in at that particular time so that when an actuating event is detected by a sensor, the programmable controller processes that state and writes output signals and enters into another state where it processes a second set of "normal" equations. The molding cycle thus progresses from beginning to end through a progression of states.

B) Preferably, the actuating event which triggers a state change is set by a predictive sensor signal which occurs prior to the actuating event in order to compensate for lag of the programmable controller and/or the system response to the output signal. The predictive sensor signal while ideal for a state transition control arrangement can also function in any conventional programmable controller scanning a first set of normal equations. Significantly, the predictive sensor signal is developed on the fly from actual sensed condition to provide a reliable and accurate sensor signal.

C) Preferably, when using a predictive sensor signal to cause the state transition, the transition from one state to the time where a scan of the second set of equations in the next successive state begins, is held until arrival of the actuating sensor signal whereby the transition from one state to another proceeds at the precise time desired without delay or early triggering.

The invention has been described with reference to a preferred embodiment. Modifications and alterations will occur to others skilled in the art upon reading and understanding the detailed description of the invention set forth herein. For example, the invention has been defined as utilizing a finite impulse response filter which is sometimes otherwise known as a FIR filter, a transversal filter, a tapped delay line filter, or a moving average filter. At least one author has identified all such filters as a nonrecursive filter. In contrast, other types of filters such as an infinite impulse response filter can be used. At least one author has defined such filters by the name recursive filter and besides calling them infinite impulse response filter, identifies such filters by additional names as FIR filter, ladder filter, lattice filter, wave digital filter, autoregressive moving average filter, ARMA filter, autoregressive integrated moving average filter and ARIMA filter. Such recursive filter is defined as a linear difference equation with constant coefficients. It is contemplated that such recursive filters can be used in the present invention in place of the finite impulse response filter illustrated. It is intended to include all such modifications and alterations insofar as they come within the scope of the invention.

Having thus defined the invention, it is claimed:

1. Control apparatus regulating the closing of an injection molding machine mold comprising:
   a. a mold having a stationary member and a moving member;
   b. hydraulic means for moving said moving mold member over a fixed distance into contact with said stationary member; said hydraulic means including a pump and flow control means variably controlling said pump in response to an electrical output signal whereby the speed of said moving member is controlled;
   c. operator console means for variably setting a command signal to establish a first crossover position whereat the speed of said moving mold member is changed in advance of a mold close position said moving mold member occupies when it contacts said stationary mold member;
   d. sensor means associated with said moving mold member to continuously generate input sensor signals indicative of the position of said moving mold member at any given time;
   e. a programmable controller for periodically evaluating a first set of equations to generate said output signal corresponding to said command signal in response to a selected sensor signal generated by said sensor means when said moving mold member reaches said first crossover position; and
   f. FIR filter means receiving said sensor signal and periodically evaluating a second set of equations determinative of the current speed of said moving mold member based on said sensor signals to develop a predictive sensor signal, said FIR means including means to transmit said predictive sensor signal as said selected sensor signal to said programmable controller at a set time prior to said moving mold member reaching said first crossover position whereby said programmable controller causes said moving mold member to change speed when it reaches said first crossover position without significant overtravel.

2. Control apparatus of claim 1 wherein said FIR filter means periodically evaluates said second set of equations to develop said predictive sensor signal indicative of a set advanced position of said moving mold member which is closer to said first crossover position from that position sensed by said sensor means and further includes means to compare said predictive sensor signal with said command signal to indicate a state of comparison and means to periodically transmit said state of comparison to said programmable controller so that a change in status of the state of comparison occurring when said predictive sensor signal indicates said moving mold member reaches said first crossover position is processed by said programmable controller at a time prior to said moving mold member reaching said first crossover position.

3. The control apparatus of claim 2 wherein said FIR filter means periodically samples and averages a plurality of sensor signals indicative of the current position of said moving mold member compared to a similarly sampled prior moving mold member position to calculate the current speed of said moving mold member and said advanced position by adding the distance said moving mold member travels at said calculated speed during said set time period to the current position of said moving mold member, said advanced position corresponding to said predictive sensor signal.

4. The control apparatus of claim 3 wherein said set time is equal to or greater than the time lag of said programmable controller attributable to the average response latency of said programmable controller.

5. The control apparatus of claim 3 wherein said set time is equal to or greater than the time lag of said programmable controller attributable to variations in response latency of said programmable controller.

6. The control apparatus of claim 1 wherein said FIR filter means periodically evaluates said second set of equations to develop a predictive sensor signal occurring at a set advanced position which is closer to said moving mold member than said first crossover position set by said command means and further includes means to compare said predictive sensor signal with said sensor signal and means to periodically transmit the state of comparison to said programmable controller so that a change in state of comparison occurring when said sensor signal indicates said moving mold member has reached said advanced position is processed by said programmable controller at a time prior to said moving mold member reaching said first crossover position.

7. The control apparatus of claim 1 further including synchronizing means delaying transmission of said output signal to said pump means until actuated by said selected sensor signal generated by said sensor means when said moving mold member physically reaches said crossover position whereby said output signal is prevented from being inadvertently early generated while simultaneous transmission of said output signal when said moving mold member reaches said crossover position is assured.

8. The control apparatus of claim 7 further including cyclic timing means associated with said synchronizing means preventing transmission of said output signal to said pump means should said selected sensor signal generated when said moving mold member reaches said crossover position be transmitted to said synchronizing means in excess of a fail safe time period.

9. The control apparatus of claim 2 further including a plurality of FIR filter means, each FIR filter means periodically evaluating a plurality of said sensor signals through a second set of equations to develop a separate predictive sensor signal indicative of the distance said moving mold member travels during a set time period based on the calculated current speed of said moving mold member, said set time period for each FIR filter means indicative of a control variable and different from one another, and said comparing means individually comparing each predictive sensor signal with a command signal to determine a change in the status of said comparison inputted to said programmable controller by said transmitting means whereby said output signal is generated by said programmable controller at a time which accounts for all time lag otherwise experienced in generating and implementing said output signal.

10. The control apparatus of claim 2 further including a second FIR means utilizing said second set of equations to develop a second predictive signal, and means for transmitting said second predictive signal to said programmable controller at the distance said moving mold member travels in the time it takes said moving mold member to stop at said mold close position, said comparator means comparing the current position of said moving mold members sensed by said sensing signals with said stopping distance correlated to said second predictive sensor signal to indicate a change in the status of comparison transmitted by said transmitting means to said programmable controller whereby said control assures that the inertia of said moving mold member will not be sufficient to impact said moving mold member with said stationary member.

11. In a control system using a programmable controller for an injection molding machine having a stationary mold member, a moving mold member, pump means for moving said moving mold member into contact with said stationary mold member, said controller evaluating a first set of equations to generate an output signal controlling said pump means in response to a continuously generated sensor signal from a sensor indicative of the position of said moving mold member whereby the speed of said moving mold member is reduced when said moving mold member reaches a first crossover position set by a command signal, the improvement comprising:

buffer means for storing said sensor signal as a plurality of sensor signals, each sensor signal corresponding to the position of said moving mold member at selected time intervals;

finite impulse response filter means for establishing a predictive sensor signal at a set time in advance of the current position of said moving mold member by periodically evaluating a plurality of said sensor signals to determine the current speed of said moving mold;

comparing means for comparing said predictive sensor signal to said command signal to indicate a state of comparison; and means for transmitting said predictive sensor signal to said controller when said comparing means senses a change in the status of said state of comparison indicative of when said moving mold member reaches said crossover position at said set advance time whereby said moving mold member changes speed when said moving mold member physically reaches said first crossover position without substantial overtravel.

12. The improvement of claim 11 wherein said finite response filter means periodically samples and averages a plurality of sensor signals indicative of the current position of said moving mold member compared to a similarly sampled prior moving mold member position to calculate the current speed of said moving mold member and adds to the current moving mold member position the distance said moving mold member travels at said calculated speed during said set time period to produce a calculated advanced position corresponding to said predictive sensor signal.

13. The improvement of claim 12 wherein said set time is equal to or greater than the time lag of said programmable controller attributable to the average response latency of said programmable controller.

14. The improvement of claim 13 wherein said set time is equal to or greater than the time lag of said programmable controller attributable to variations in the response latency of said programmable controller.

15. The improvement of claim 11 further including synchronizing means for delaying transmission of said output signal to said pump means until actuated by a selected sensor signal generated by said sensor when said moving mold member physically reaches said crossover position whereby said output signal is prevented from being inadvertently early generated while simultaneous transmission of said output signal when said moving mold member reaches said crossover position is assured.

16. The improvement of claim 15 further including cyclic timing means associated with said synchronizing means preventing transmission of said output signal to said pump means should said selected sensor signal generated when said moving mold member reaches said crossover position be transmitted to said synchronizing means in excess of a fail safe time period.

17. The improvement of claim 12 further including a plurality of finite impulse response filter means, each finite impulse response filter means periodically evaluating a plurality of said sensor signals through a second set of equations to develop a separate predictive sensor signal indicative of the distance said moving mold member travels during a set time period based on the calculated current speed of said moving mold member, said set time period for each finite impulse response filter means indicative of a control variable and different from one another, and said comparing means individually comparing each predictive sensor signal with a command signal to determine a change in the status of comparison inputted to said programmable controller by said transmitting means whereby said output signal is generated by said programmable controller at a time which accounts for all time lag otherwise experienced in generating and implementing said output signal.

18. The improvement of claim 12 further including a second finite impulse response filter means utilizing said second set of equations to develop a second predictive signal, and means for transmitting said second predictive signal to said programmable controller at the distance said moving mold member travels in the time it takes said moving mold member to stop at a mold close position, said comparator means comparing the current position of said moving mold members sensed by said sensing signals with said stopping distance correlated to said second predictive sensor signal to indicate a change in the status of comparison transmitted by said transmitting means to said programmable controller whereby said control assures that the inertia of said moving mold member will not be sufficient to impact said moving mold member with said stationary member.

19. A control system regulating at least one output device by an output signal produced in response to a sensor sensing measurements indicative of when an actual event programmed into a programmable controller as a command signal occurs, said sensor generating prior sensor signals before said actual event occurs and an actuating sensor signal when said actual event occurs, said control system comprising:

said programmable controller periodically evaluating a first set of normal equations to produce at least said output signal in response to said actuating sensor signal;

FIR means for establishing a predictive sensor signal indicative of the occurrence of said event prior to the time said actuating sensor signal is generated by periodically evaluating a second set of equations utilizing certain prior sensor signals;

means comparing said predictive sensor signal with one of i) said prior sensor signals and ii) said command signal to determine a state of comparison; and transmitting means actuated when said comparing means indicates a change in the state of comparison to transmit said predictive sensor signal as said actuating signal to said programmable controller at a set time prior to the occurrence of said actual event which substantially coincides with the time expended by said programmable controller in evaluating said first set of equations whereby the response latency of said controller is substantially eliminated.

20. The control system of claim 19 further including synchronizing means for delaying transmission of said output signal to said output device until actuated by said actuating sensor signal whereby said output signal is prevented from being inadvertently early generated while simultaneous transmission with the occurrence of said actuating sensor signal is assured.

21. The control system of claim 20 further including cyclic timing means associated with said synchronizing means preventing transmission of said output signal to said output device should said actuating sensor signal be transmitted to said synchronizing means in excess of a fail safe time period.

22. The control system of claim 19 wherein said FIR means periodically samples and averages a plurality of sensor signals indicative of the current state of said event compared to a similarly sampled plurality of previously occurring sensor signals to calculate when said command signal occurs and reduces said calculated time by a time period equal to said set time to produce said predictive sensor signal, and said comparing means comparing said sensor signals to said predictive signal to indicate a change in said state of comparison at said set time prior to the occurrence of said event.

23. The control system of claim 19 wherein said FIR means periodically samples and averages a plurality of sensor signals indicative of the current state of said event compared to a similarly sampled plurality of previously occurring sensor signals indicative of a prior state of said event to calculate a future state of said event which is predicted to occur at said set time period to produce said predictive sensor signal and said comparing means comparing said predictive sensor signal with said command signal to indicate when a change in state of comparison occurs so that said predictive signal is transmitted by said transmitting means to said programmable controller at a time prior to the occurrence of said actual event equal to said set time.

24. The control system of claim 23 wherein said state is a distance.

25. A method for controlling the molding cycle of an injection molding machine comprising the steps of:

a. sensing a plurality of events occurring during a molding cycle and generating sensor signals for said events, at least one specific sensor signal continuously generated before and during a specific event by a continuous sensor;

b. inputting said sensor signals and command signals which define said events into a programmable controller;

c. periodically evaluating a set of normal equations during a scan time of said programmable controller to produce at least a first output signal for a specific physical device associated with said molding machine for controlling a portion of said molding cycle affected by said specific event;

d. periodically evaluating a second set of equations utilizing said specific sensor signals to produce a predictive sensor signal indicative of an event estimated to occur at a future set time in place of said specific sensor signal;

e. comparing said predictive sensor signal with a command signal indicative of said specific event; and f. transmitting to said programmable controller said predictive sensor signal, when a change in the status of comparison has occurred in step (e), at said set time prior to the occurrence of said specific event to cause said controller to generate said first output signal at the time said specific event occurs.

26. The method of claim 25 wherein said set time is equal to the scan time of said programmable controller.

27. The method of claim 26 further including the step of delaying the transmission of said first output signal from said controller to said specific output device until said continuous sensor actually senses the occurrence of said special event.

28. The method of claim 25 further including in step d) periodically sampling and averaging a plurality of current sensor signals sensed by said continuous sensor signal and factoring said current average sensor signal with an averaged plurality of prior sensor signals in said second set of equations to determine said set time at which said predictive sensor signal is inputted to said programmable controller.

29. The method of claim 28 wherein said special event is mold closing; said continuous sensor measures the distance traveled by a moving mold member towards a stationary mold member; said second set of equations determines a predicted position based on the current sensed speed of said moving mold which said moving mold member travels during said set time period from its current position, said predictive sensor signal indicative of said predicted position of said moving mold member at any given time; said command signal indicative of a crossover position at which position the speed of said moving mold member is reduced; said comparing step comparing said predicted position of said moving mold member with said crossover position so that when said predicted position of said moving mold member reaches said crossover position, a change in the status of comparison occurs and said predictive signal is sent to said programmable controller whereby said output signal is transmitted to said physical device at substantially the precise time said crossover position is physically reached by said moving mold member.

30. A method for controlling a molding cycle in which mold members are closed, molding material injected into the closed mold, recovered and the mold is opened whereat themolded part is ejected, said method comprising the steps of:

generating at least one input sensor signal;

periodically evaluating a first set of normal equations indicative of any given state of said molding cycle by a programmable controller scanning said first set of normal equations to develop, at the completion of a scan, at least one output signal resulting from said input sensor signal;

said output signal causing said programmer to stop evaluating said first set of normal equations and to start evaluating a second set of normal equations indicative of a successive state of said molding cycle; and during said successive state and prior to starting the scan of said second set of equations by said programmable controller, reading said output signal out to control said output device.

31. The method of claim 30 wherein a sensor for sensing the occurrence of an event develops said sensor signal and a second controller periodically evaluates a special set of equations to develop a predictive sensor signal at a set time in advance of the occurrence of said event; said predictive sensor signal processed by said first controller during said evaluation of said first set of equations as if said predictive sensor were said sensor signal.

32. The method of claim 31 further including delaying the scan of said next successive state and the reading out of said output signal until said sensor develops an actual sensor signal of the occurrence of said event inputted to said successive state to allow the scan of said second set of normal equations by said first controller to proceed.

* * * * *